US012578573B2

(12) United States Patent
Ahn et al.

(10) Patent No.: US 12,578,573 B2
(45) Date of Patent: Mar. 17, 2026

(54) SYSTEM AND METHOD DESIGNING METALENS

(71) Applicant: SAMSUNG ELECTRONICS CO., LTD., Suwon-si (KR)

(72) Inventors: Ho Young Ahn, Suwon-si (KR); Hyeon Soo Park, Suwon-si (KR); Seong Woon Booh, Suwon-si (KR); Kyu Il Lee, Incheon (KR); Mun Bo Shim, Yongin-si (KR); Seung Hoon Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 645 days.

(21) Appl. No.: 17/994,127

(22) Filed: Nov. 25, 2022

(65) Prior Publication Data

US 2023/0176366 A1    Jun. 8, 2023

(30) Foreign Application Priority Data

Dec. 2, 2021    (KR) .......................... 10-2021-0170996
Jan. 28, 2022    (KR) .......................... 10-2022-0012871

(51) Int. Cl.
*G02B 27/00* (2006.01)

(52) U.S. Cl.
CPC ................................ *G02B 27/0012* (2013.01)

(58) Field of Classification Search
CPC ...... G02F 1/0311; G02F 1/0305; G02F 1/017; G02F 1/015; G02F 1/0151; G02F 1/0102; G02F 1/0063; G02F 1/0018; H01Q 15/0086; G02B 27/4272; G02B 27/0012; G02B 1/002; G02B 3/0087; G02B 2207/101

USPC .................................................. 359/642, 652
See application file for complete search history.

(56) References Cited

U.S. PATENT DOCUMENTS

| | | | |
|---|---|---|---|
| 10,634,557 B2 | 4/2020 | Khorasaninejad et al. | |
| 11,092,717 B2 | 8/2021 | Capasso et al. | |
| 2020/0174163 A1 * | 6/2020 | Han | G02B 5/1895 |
| 2020/0355913 A1 | 11/2020 | Park et al. | |
| 2021/0103075 A1 | 4/2021 | Park et al. | |
| 2021/0149082 A1 | 5/2021 | Chen et al. | |

(Continued)

FOREIGN PATENT DOCUMENTS

KR    20200067074 A    6/2020

*Primary Examiner* — Travis S Fissel
(74) *Attorney, Agent, or Firm* — Fish & Richardson P.C.

(57) ABSTRACT

A system and method designing a metalens including nanostructures and a spacer layer between the nanostructures. The method includes; selecting a design area in relation to a width of the nanostructure and a pitch of the nanostructure, setting a search route in the design area in a direction in which a phase decreases, calculating transmittance at a reference point on the search route and change points near the reference point along the search route, determining the width of the nanostructure and the pitch of the nanostructure, generating a phase map corresponding to the width of the nanostructure and the pitch of the nanostructure, extracting an extracted width of the nanostructure and an extracted pitch of the nanostructure having a target phase from the phase map, and placing the nanostructure having the extracted width and extracted pitch in relation to the metalens corresponding to the target phase.

20 Claims, 29 Drawing Sheets

(56) References Cited

U.S. PATENT DOCUMENTS

| 2021/0247549 | A1 |   | 8/2021 | Park et al. |  |
|---|---|---|---|---|---|
| 2022/0146711 | A1 | * | 5/2022 | Greco | .................... G02B 1/002 |

* cited by examiner

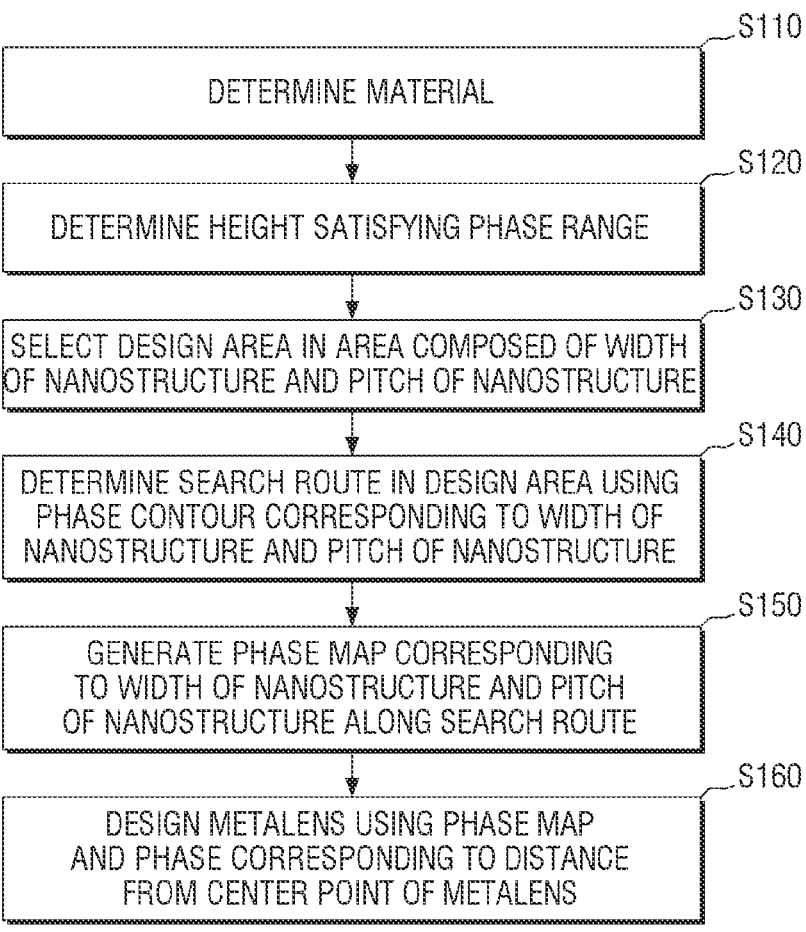

S110

DETERMINE MATERIAL

S120

DETERMINE HEIGHT SATISFYING PHASE RANGE

S130

SELECT DESIGN AREA IN AREA COMPOSED OF WIDTH OF NANOSTRUCTURE AND PITCH OF NANOSTRUCTURE

S140

DETERMINE SEARCH ROUTE IN DESIGN AREA USING PHASE CONTOUR CORRESPONDING TO WIDTH OF NANOSTRUCTURE AND PITCH OF NANOSTRUCTURE

S150

GENERATE PHASE MAP CORRESPONDING TO WIDTH OF NANOSTRUCTURE AND PITCH OF NANOSTRUCTURE ALONG SEARCH ROUTE

S160

DESIGN METALENS USING PHASE MAP AND PHASE CORRESPONDING TO DISTANCE FROM CENTER POINT OF METALENS

Phase Contour

Trajectory

FIG. 15
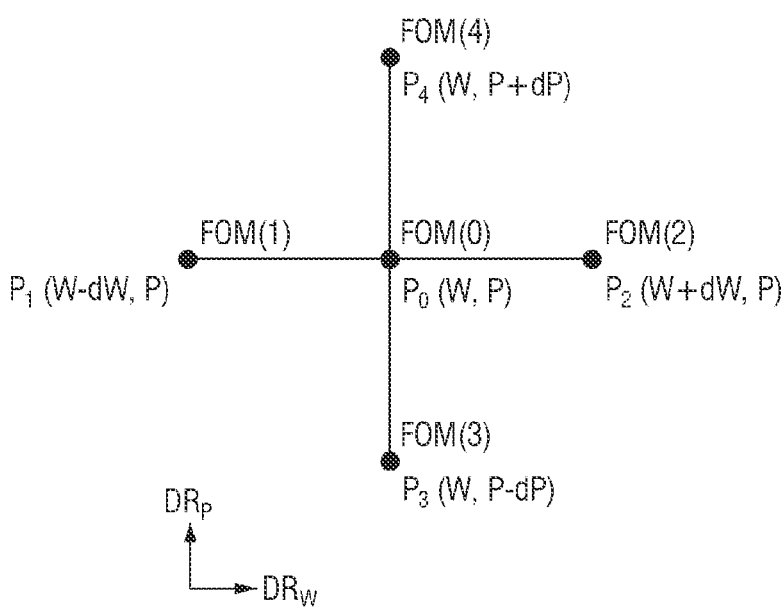
FIG. 16
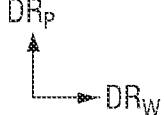

Lens Design - one cycle

Phase Profile Target

<u>100</u>

$FOM(1)$ $FOM(2)$
$P_1 (W_1 -dW_1, W_2 +dW_2, P+dP)$ $P_2 (W_1 +dW_1, W_2 +dW_2, P+dP)$ $FOM(3)$ $FOM(4)$
$P_3 (W_1 -dW_1, W_2 -dW_2, P+dP)$ $P_4 (W_1 +dW_1, W_2 -dW_2, P+dP)$ $FOM(0)$
$P_0 (W_1, W_1, P)$ $FOM(5)$ $FOM(6)$
$P_5 (W_1 -dW_1, W_2 +dW_2, P-dP)$ $P_6 (W_1 +dW_1, W_2 +dW_2, P-dP)$ $FOM(7)$ $FOM(8)$
$P_7 (W_1 -dW_1, W_2 -dW_2, P-dP)$ $P_8 (W_1 +dW_1, W_2 -dW_2, P-dP)$

Trajectory

Lens Design - one cycle

SYSTEM AND METHOD DESIGNING METALENS

This application claims priority under 35 U.S.C. § 119 to Korean Patent Application No. 10-2021-0170996 filed on Dec. 2, 2021 and Korean Patent Application No. 10-2022-0012871 filed on Jan. 28, 2022, the collective subject matter of which is hereby incorporated by reference in its entirety.

BACKGROUND

1. Field of the Disclosure

The inventive concept relates generally to systems and methods for designing metalens.

2. Description of the Related Art

A metalens may include a nanostructure, wherein the phase of incident light varies in accordance with a width of the nanostructure, a pitch of the nanostructure, and/or the wavelength of the incident light, etc. This result arises due to an effective refractive index that varies in relation to physical properties of the nanostructure. Accordingly, the optical properties (e.g., a desired focal length) of a metalens may be designed by adjusting the width, pitch, height and/or material composition of a constituent nanostructure.

SUMMARY

According to an embodiment of the present inventive concept, a metalens design system may include; a memory storing a design tool, and a processor configured to execute the design tool to design a metalens including nanostructures and a spacer layer between the nanostructures, wherein the design tool: selects a design area from an available area defined by of a width of the nanostructure and a pitch of the nanostructure; sets a search route in the design area using a phase contour corresponding to the width of the nanostructure and the pitch of the nanostructure; determines the width of the nanostructure and the pitch of the nanostructure along the search route and generates a phase map corresponding to the width of the nanostructure and the pitch of the nano-structure; extracts the width of the nanostructure and the pitch of the nanostructure corresponding to a distance from a center point of the metalens using the phase map and a target phase corresponding to the distance from the center point of the metalens; and places the nanostructure having an extracted width and an extracted pitch at a position of the metalens corresponding to the target phase.

According to an embodiment of the present inventive concept, a metalens design system may include; a method of designing a metalens including nanostructures and a spacer layer between the nanostructures. The method may include; selecting a design area in relation to a width of the nano-structure and a pitch of the nanostructure, setting a search route in the design area in a direction in which a phase decreases, calculating transmittance at a reference point on the search route and change points near the reference point along the search route, determining the width of the nano-structure and the pitch of the nanostructure, generating a phase map corresponding to the width of the nanostructure and the pitch of the nanostructure, extracting an extracted width of the nanostructure and an extracted pitch of the nanostructure having a target phase from the phase map, and placing the nanostructure having the extracted width and extracted pitch in relation to the metalens corresponding to the target phase.

According to an embodiment of the present inventive concept, a metalens design system may include; a method of designing a metalens including nanostructures and a spacer layer between the nanostructures. The method may include; determining a material of the nanostructure, a material of the spacer layer, and a height of the nanostructure, selecting a design area from an available area in relation to a width of the nanostructure and a pitch of the nanostructure, setting a search route in the design area in a direction providing a $2\pi$ phase decrease from a maximum phase value in the design area using a phase contour corresponding to the width of the nanostructure and the pitch of the nanostructure, determining the width of the nanostructure and the pitch of the nanostructure along the search route, generating a phase map corresponding to the width of the nanostructure and the pitch of the nanostructure, extracting an extracted width of the nanostructure and an extracted pitch of the nanostructure corresponding to a distance from a center point of the metalens using the phase map and a target phase corresponding to the distance from the center point of the metalens, and placing the nanostructure having the extracted width and extracted pitch at a position of the metalens corresponding to the target phase.

BRIEF DESCRIPTION OF THE DRAWINGS

Advantages, benefits, and features, as well as the making a use of the inventive concept will become more apparent upon consideration of the following detailed description together with the accompanying drawings, in which:

FIG. 8 is a flowchart illustrating a method of designing a metalens with a single layer according to embodiments of the inventive concept;

FIG. 9 is a block diagram illustrating, in part, a metalens;

FIGS. 15, 16 and 17 are respective conceptual diagrams illustrating a reference point and change points;

DETAILED DESCRIPTION

Throughout the detailed description and drawings, like reference numbers, symbols and labels are used to denote like or similar elements, components, features and/or method steps.

Figure 1:
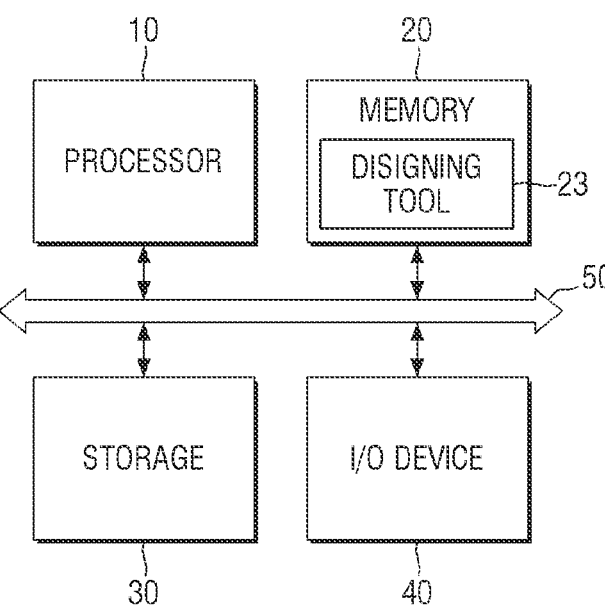
FIG. 1 is a block diagram illustrating a metalens design system according to embodiments of the inventive concept.

FIG. 1 is a block diagram illustrating a metalens design system according to embodiments of the inventive concept.

Referring to FIG. 1, the metalens design system according to some embodiments may include a processor 10, a memory 20 storing a design tool 23, a storage 30, and an input/output (I/O) device 40. Here, the processor 10, memory 20, storage 30, and I/O device 40 may be variously interconnected through a bus 50.

The metalens design system may be implemented as a dedicated (or stand-alone) device capable of designing a metalens according to embodiments of the inventive concept. Alternately, the metalens design system may be implemented as general-purpose computing system executing the design tool 23 which is capable of designing a metalens according to embodiments of the inventive concept. Here, the design tool 23 may include one or more design program(s), verification program(s), and/or simulation program(s), wherein each of these constituent programs may be implemented in one or more conventionally-understood programming language(s).

The processor 10 may control the overall operation of the metalens design system. That is, the processor 10 may be configured to execute (or perform) the design tool 23 using software, firmware and/or hardware, wherein the software may include, for example, application program(s), operating system(s), and/or device driver(s). Thus, the processor 10 may execute an operating system loaded in the memory 20, and may further execute various application programs in relation to the operating system. In this regard, the processor 10 may execute the design tool 23, as loaded in the memory 20, in order to design, verify, test and/or simulate a metalens according to embodiments of the inventive concept.

The operating system and/or various application program(s) may also be loaded in the memory 20. For example, the operating system (OS) may be loaded in the storage 30, as part of a boot sequence, when the metalens design system is booted. Input and/or output operations in relation to the metalens design system may be supported by the operating system. The design tool 23, along with various application program(s), may be loaded in the memory 20 upon boot-up, or in response to a user input.

The memory 20 may be implemented using a volatile memory, such as a static random access memory (RAM) (SRAM) or a dynamic RAM (DRAM), and/or a nonvolatile memory, such as a phase-change RAM (PRAM), a magnetic RAM (MRAM), a resistive RAM (ReRAM), a ferro-magnetic RAM (FRAM), or flash memory (e.g., NOR-type flash memory).

The storage 30 may be provided in addition to the memory 20 as a storage medium used during the operation of the metalens design system. In this regard, the storage 30 may be used to store application program(s), operating system(s), and various kinds of data.

The storage 30 may be variously implemented using a memory card (e.g., a MMC, an eMMC, a SD, a MicroSD, etc.) and/or a hard disk drive (HDD) or a solid state drive (SSD). The storage 30 may include flash memory (e.g., NAND-type flash memory). Alternately, the storage 30 may include a next-generation nonvolatile memory, such as PRAM, MRAM, ReRAM, FRAM, NOR-type flash memory, etc.

The I/O device 40 may be used to communicate (e.g., receive and/or transmit) data between the metalens design system and a user. For example, the I/O device 40 may receive various commands (e.g., various design tool execution commands) in response to user input. The I/O device 40 may also visually provide feedback to the user in response to execution of the metalens design system.

Figure 2:
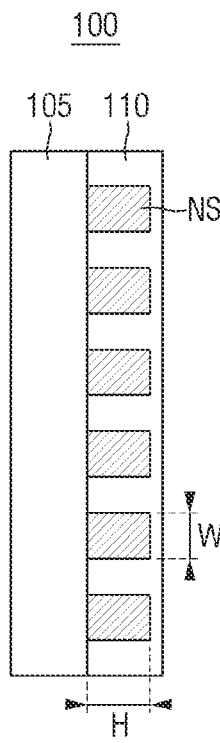
FIG. 2 is a cross-sectional diagram illustrating a metalens.

FIG. 2 is a cross-sectional diagram generally illustrating a metalens 100.

Referring to FIG. 2, the metalens 100 may include a substrate 105, nanostructures NS, and a spacer layer 110. The nanostructures NS may be variously disposed on the substrate 105, and the spacer layer 110 may be disposed to substantially cover the nanostructures NS on the substrate 105. (Here, it should be noted that an arrangement of multiple nanostructures NS is also termed a "nanostructure.")

The substrate 105 may include material(s) having a refractive index (e.g., a first refractive index) different from that of the nanostructures NS (e.g., a second refractive index). In some embodiments, the difference between the first and second refractive indexes may be greater than or equal to 0.5. For example, the second refractive index of the nanostructures NS may be greater (or less) than the first refractive index of the substrate 105.

The spacer layer 110 may include material(s) having a third refractive index different from the second refractive index of the nanostructures NS. In some embodiments, the difference between the third refractive index of the spacer layer 110 and the second refractive index of the nanostructures NS may be greater than or equal to 0.5. For example, the third refractive index of the spacer layer 110 may be less (or greater) than the second refractive index of the nanostructures NS. One example in which the second refractive index of the nanostructures NS is greater than the third refractive index of the spacer layer 110 will be described hereafter in some additional detail.

The substrate 105 may include glass (e.g., fused silica, BK7, etc.), quartz, a polymer (e.g., PMMA, SU-8, etc.), plastic and/or a semiconductor material. The nanostructures NS may include at least one of c-Si, p-Si, a-Si, a III-V compound semiconductor material (e.g., GaP, GaN, GaAs, etc.), SiC, $TiO_2$, and/or SiN. The spacer layer 110 may include a polymer material such as SU-8 or PMMA, and/or a low refractive material such as $SiO_2$.

The nanostructures NS may be designed and implemented to have a sub-wavelength shape dimension. Here, the term "shape dimension" refers to at least one value defining the shape of the nanostructures NS. Thus, a sub-wavelength shape dimension may refer to a dimension smaller than a wavelength at which the metalens 100 collects incident light. In this manner, the effective refractive index of the metalens 100 may be determined by the arrangement and density of the nanostructures NS. For example, one or more area(s) of the metalens 100 having a relatively high density of nanostructures NS may exhibit a high refractive index or a relatively high effective refractive index. Accordingly, by adjusting the arrangement, density and/or shape (e.g., dimension(s)) of the nanostructures NS, the effective refractive index of the metalens 100 may be determined.

Figure 3:
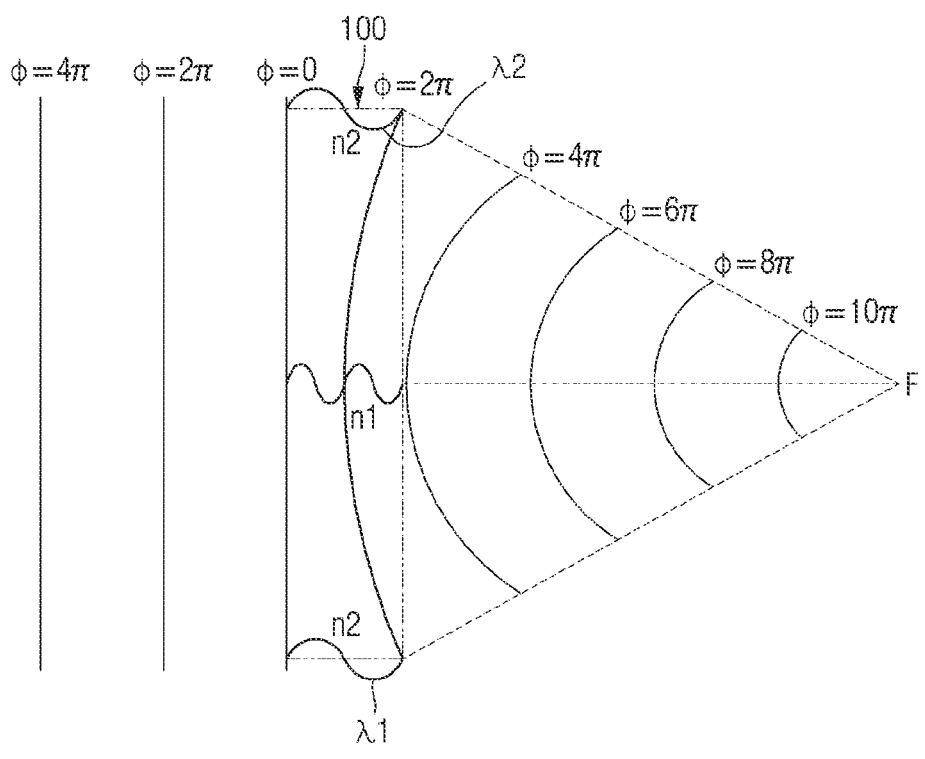
FIGS. 3, 4 and 5 are respective diagrams collectively illustrating operation of a metalens.
Figure 4:
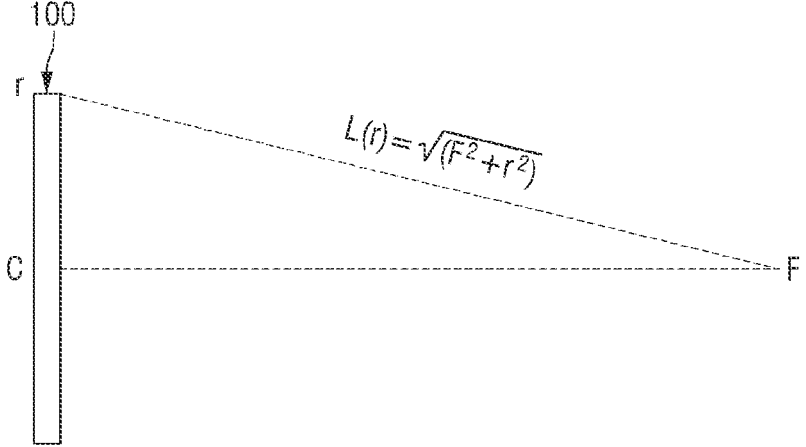
Figure 5:
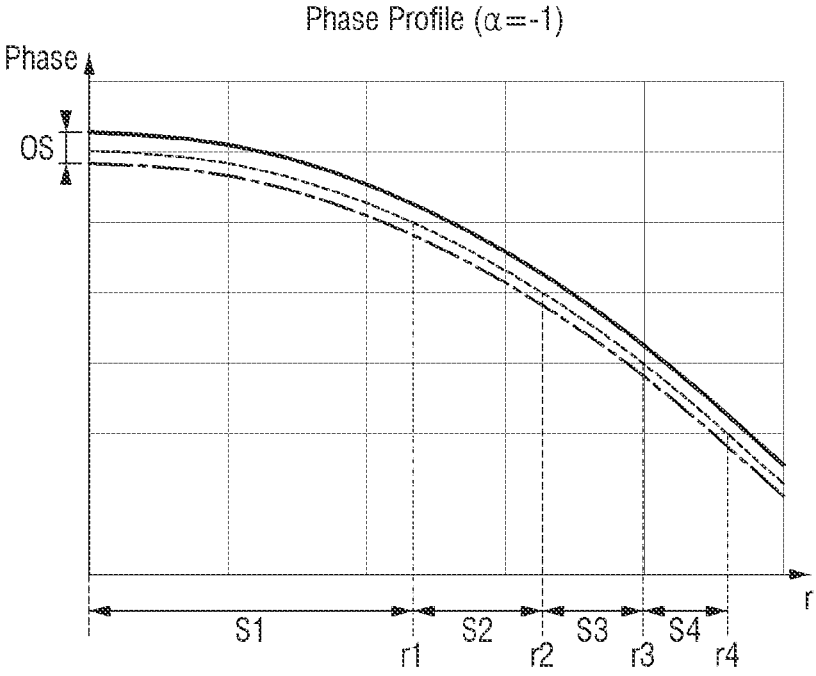

FIGS. 3, 4 and 5 are various diagrams collectively illustrating operation of a metalens.

Referring to FIG. 3, in a first portion (or a "first area") of the metalens 100 having a high refractive index n1, the speed of incident light is decreased, and accordingly, the progression of a corresponding wavefront in the first area is delayed. Assuming that a first wavelength λ1 is shorter than a second wavelength λ2, a second area of the metalens 100 may have a low refractive index n2. Accordingly, the phase of incident light may be higher in the first area (here, a more central area) of the metalens 100 having a higher refractive index n1, as compared with the second area (here, a more peripheral area). For example, based on the phase Φ of one surface of the metalens 100 on which a wavelength is incident, the phase Φ may be 4π in the first area of the metalens having a high refractive index n1, and the phase Φ may be 2η in the second area of the metalens 100 having a low refractive index n2. Thus, with respect to first area of the metalens 100 having the high refractive index n1, the second area of the metalens 100 having the low refractive index n2 exhibits a phase difference of about −2π.

In this manner, the metalens 100 may change (or adjust) the phase Φ of incident light passing through the metalens 100. That is, in relation to the illustration of FIG. 3, incident light traveling as a plane wave from left to right (e.g., towards a focal point F) will exhibit a positional phase difference that varies over the metalens 100 due to a distribution of refractive indexes of the metalens 100. Accordingly, the original planar wave of the incident light may be substantially converted into a more spherical wave due to the varying refractive indexes of the metalens 100.

Referring to FIG. 4, an optical path difference 'ΔL' from the focal point F to the surface of the metalens 100 may be express according to Equation 1 that follows:

$$\Delta L = F - \sqrt{F^2 + r^2}$$ [Equation 1]

In this case, a phase difference may be a function of a distance 'r' from the center point 'C' of the metalens 100 (e.g., a phase according to the distance 'r' from the metalens 100 with respect to the center point C of the metalens 100). Thus relationship may be further express by Equation 2 that follows:

$$\frac{2\pi f_0}{c} \Delta L (1 + x) =$$ [Equation 2]

$$\frac{2\pi f_0}{c} F \left(1 - \sqrt{1 + (r/F)^2}\right)(1 + x) \cong -\frac{\pi f_0}{c} \frac{r^2}{F}(1 - x) =$$

$$-\frac{\pi f_0}{c F_0}(1 - x)^{\alpha+1} r^2$$

Here, for the variables $$x = \frac{(f - f_0)}{f_0}, \text{ and } f = \frac{c}{\lambda},$$

'c' is the speed of light, 'λ' is the wavelength of incident light, and 'α' is a chromatic aberration coefficient.

FIG. 5 is graph illustrating phase profile(s) for incident light of different wavelengths. Referring to FIG. 5 and assuming that 'α' is −1, a phase profile corresponding to the distance 'r' from the center point 'C' of the metalens 100 with respect to the center point 'C' of the metalens 100 may be a curve close to a quadratic function with respect to the distance 'r' from the center point 'C' of the metalens 100. When the phase profile corresponding to the distance 'r' from the center point 'C' of the metalens 100 with respect to the center point 'C' of the metalens 100 is as shown in FIG. 5, the metalens 100 may focus light on the focal point 'F', as shown in FIG. 4. In this manner, the metalens 100 may be designed to have the phase profile of FIG. 5.

That is, once the distance 'r' from the center point 'C' of the metalens 100 is determined, a phase corresponding to the distance 'r' may be determined. Accordingly, a metalens according to embodiments of the inventive concept may be designed by adjusting a width and a pitch of the nanostructures NS and by arranging the nanostructures NS in accordance with the phase corresponding to the distance 'r'. It follows that design methods (or metalens design systems) according to embodiments of the inventive concept, may be used to quickly and more accurately design metalens without necessary recourse to database(s) listing phases for different widths and pitches of the nanostructures NS. Accordingly, should a change be made to a dimension and/or a constituent material of the nanostructures NS (e.g., if a manufacturing process associated with the nanostructures NS be varied), it will not be necessary to reconstruct database(s) of the type conventionally used during determination of a phase corresponding to the distance 'r'. Accordingly, it is possible to more quickly respond to design changes associated with the nanostructures NS and/or changes in the manufacturing process for the nanostructures NS.

Using this approach, for example, in relation to a phase profile corresponding to the distance 'r' from the center point 'C' of the metalens 100, a phase range of 2π may be repeated defined in a quick an accurate manner. Accordingly, when the metalens 100 is designed in a section in which the phase profile is 2π, the metalens 100 in another section may also be designed accordingly.

Figure 6:
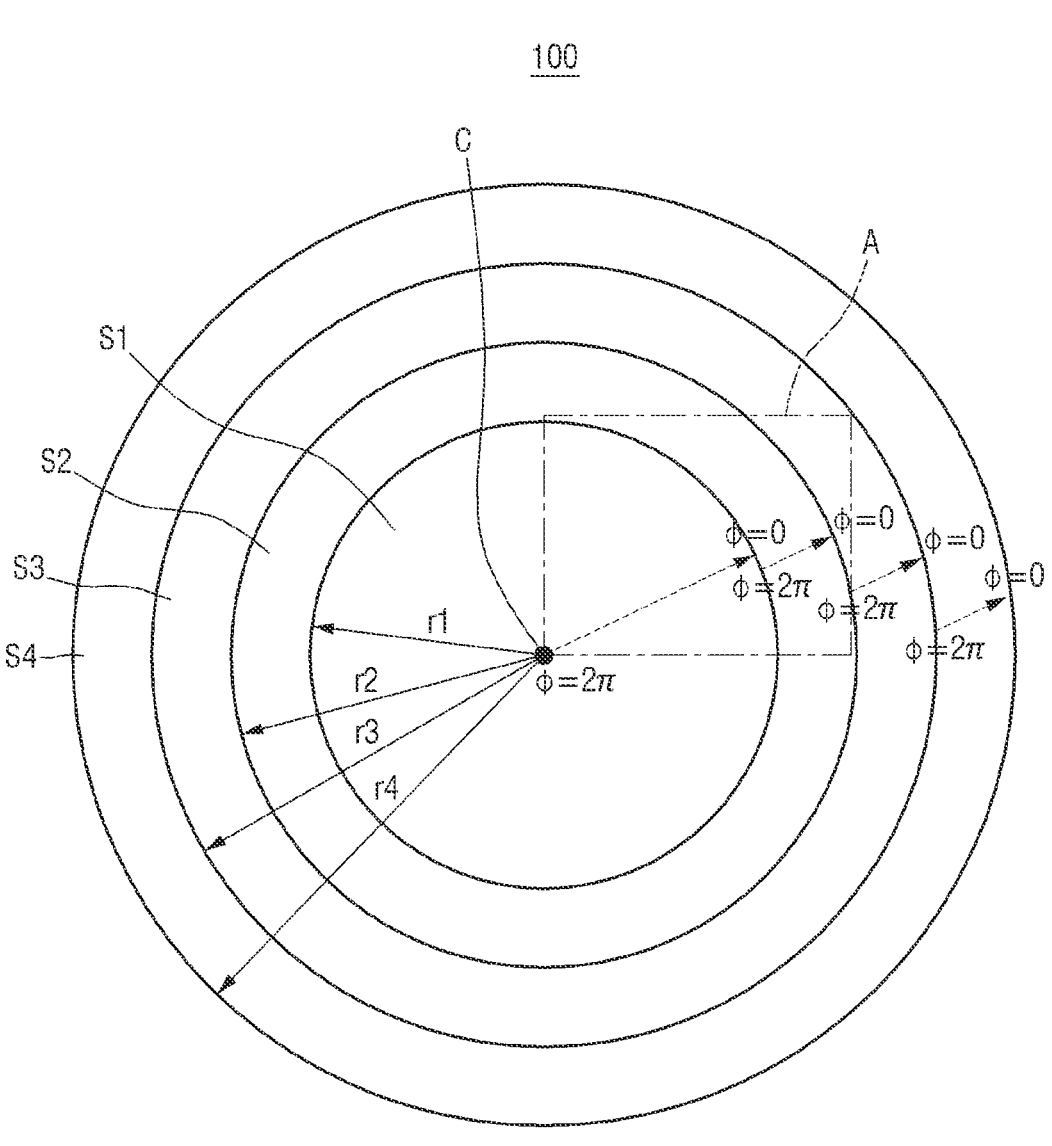
FIG. 6 is a conceptual diagram illustrating a metalens according to embodiments of the inventive concept.
Figure 7:
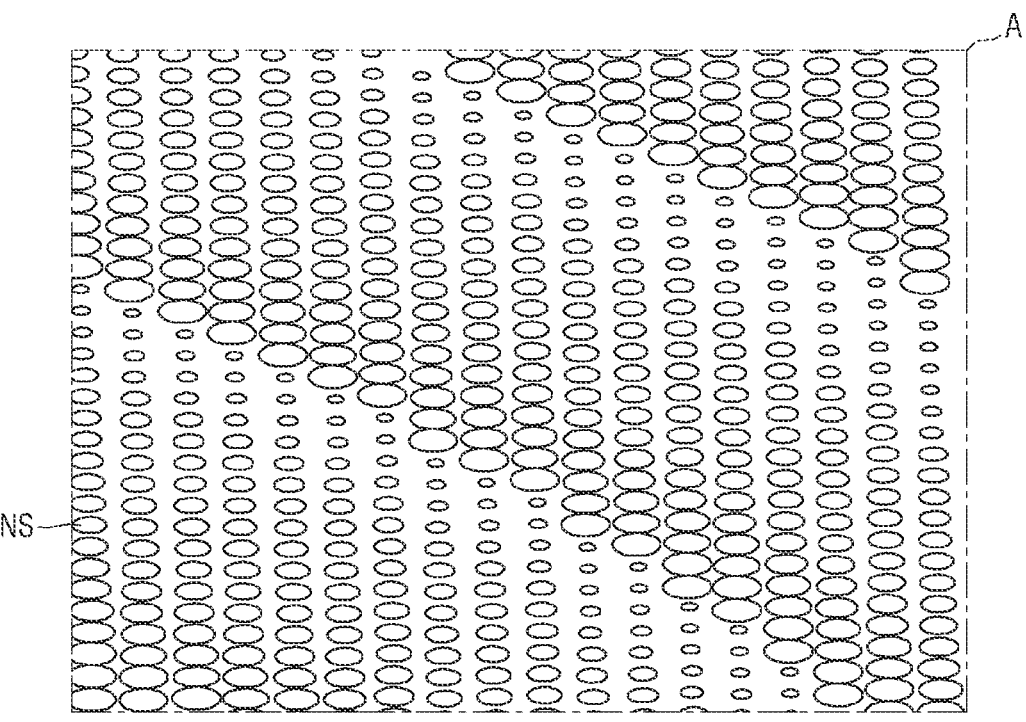
FIG. 7 is an enlarged diagram further illustrating area 'A' indicated in FIG. 6.

FIG. 6 is a conceptual diagram illustrating a metalens according to embodiments of the inventive concept, and FIG. 7 is an enlarged view of area 'A' indicated in FIG. 6. In this regard, the metalens 100 of FIG. 6 is assumed to satisfy the phase profile described in relation to FIG. 5.

Referring to FIGS. 5, 6 and 7, the metalens 100 may include a vast arrangement of nanostructures NS arranged circumferentially and radially with respect to the center point C of the metalens 100.

The metalens 100 may include a first area S1, a second area S2, a third area S3 and a fourth area S4, wherein the first area S1 has a substantially circular shape defined by a first radius r1 extending from the center point C; the second area S2 has an annular shape surrounding the first area S1 and defined between the first radius r1 and a second radius r2; the third area S3 has an annular shape surrounding the second area S2 and defined between the second radius r2 and a third radius r3; and the fourth area S4 has an annular shape surrounding the third area S3 and defined between the third radius r3 and a fourth radius r4.

With respect to the areas S1, S2, S3, and S4, a phase difference $\Phi$ for light incident into each of the areas S1, S2, S3, and S4 may be $2\pi$. For example, the phase of light incident into each of the areas S1, S2, S3, and S4 may have a value that decreases from a maximum phase value in the corresponding one of the areas S1, S2, S3, and S4 by $2\pi$ as the distance from the center point C of the metalens 100 increases in the corresponding one of the areas S1, S2, S3, and S4. That is, a point closest to the center point C in each of the areas S1, S2, S3, and S4 may have a maximum phase value in the corresponding one of the areas S1, S2, S3, and S4, and a point furthest from the center point C in each of the areas S1, S2, S3, and S4 may have a minimum phase value in the corresponding one of the areas S1, S2, S3, and S4, wherein the minimum phase value is less than the maximum phase value by $2\pi$.

Referring to FIG. 7, when the nanostructures NS has a higher refractive index than surrounding materials, the effective refractive index may increase in order to increase the phase of incident light, as the density of the nanostructures NS increases. Accordingly, the density of the nanostructures NS in each of the areas S1, S2, and S3 may decrease as the distance from the center point C of the metalens 100 increases.

Figure 9:
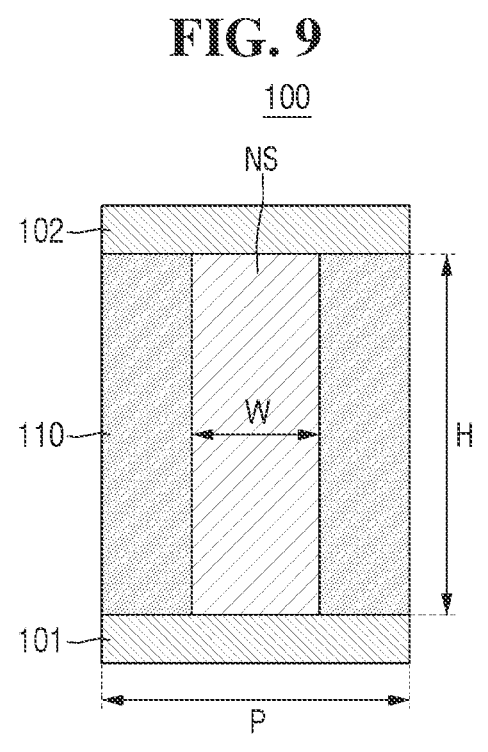

FIG. 8 is a flowchart illustrating a method of designing a metalens with a single layer according to embodiments of the inventive concept, and FIG. 9 is a block diagram illustrating, in part, relevant aspects of the metalens being designed in FIG. 8. Here, it is assumed that method of FIG. 8 is performed by the metalens design system of FIG. 1.

Referring to FIGS. 8 and 9, constituent material(s) for the metalens 100 may be determined (S110).

For example, constituent material(s) for the nanostructures NS and the spacer layer 110 of the metalens 100 may be determined. In this regard, the nanostructures NS and the spacer layer 110 of the metalens 100 may be disposed between a first protective layer 101 and a second protective layer 102, wherein the first protective layer 101 and the second protective layer 102 may include quartz, for example. However, in some embodiments one or both of the first protective layer 101 and the second protective layer 102 may be omitted.

The height H of the metalens 100 may be determined to satisfy a phase range condition (S120).

For example, one phase range condition may indicate that the phase decreases by $2\pi$ from a maximum phase value as the distance r from the center point C of the metalens 100 increases. Here, the maximum phase value may be a maximum phase value for the design area. Since a product of a difference between the refractive index of the nanostructures NS and the refractive index of the spacer layer 110 and the height H of the nanostructures NS is proportional to the phase range, the height of the nanostructures NS may be determined such that the phase range is $2\pi$.

Figure 10:
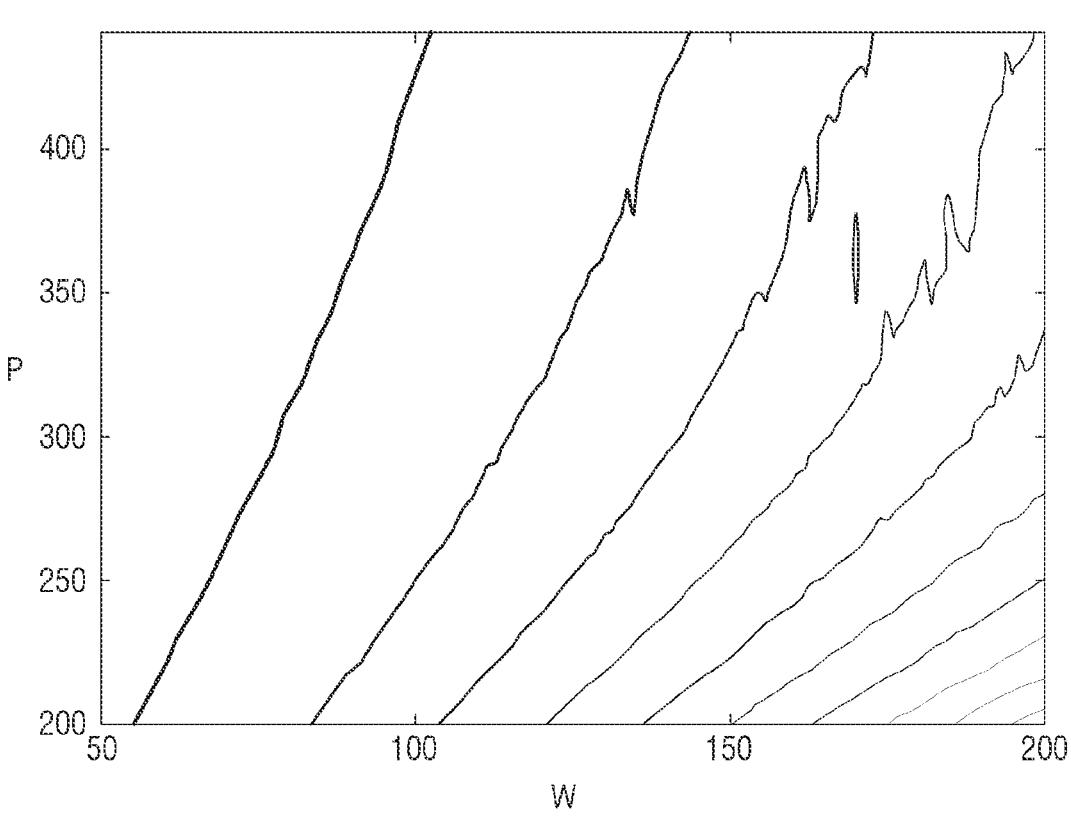
FIG. 10 is a diagram illustrating a design area and an area composed of the width and pitch of a nanostructure.
Figure 11:
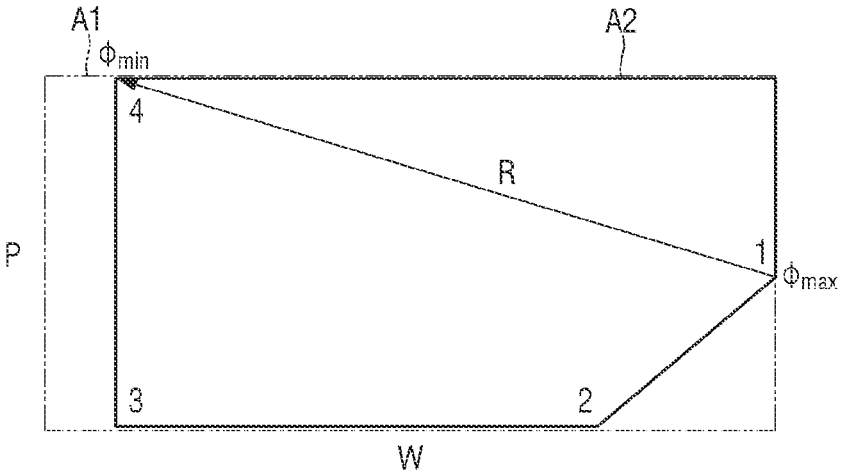
FIG. 11 is a conceptual diagram illustrating a phase contour corresponding to the width of a nanostructure and the pitch of a nanostructure at a specific wavelength.
Figure 12:
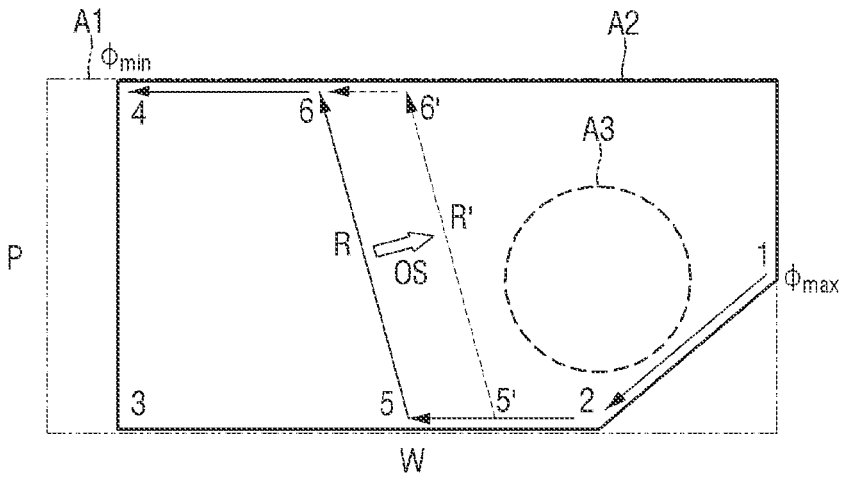
FIG. 12 is a conceptual diagram illustrating a design area and an area composed of the width and pitch of a nano-structure.

Referring to FIGS. 10, 11 and 12, an acceptable design area A2 may be selected from an available area A1 defined in relation to (or composed of) a width W of the nanostructures NS and a pitch P of the nanostructures NS (S130).

The design area A2 may be selected according to process feasibility or design convenience. For example, an upper limit of the pitch P of the metalens 100 may be determined by a sub-wavelength, and a lower limit of the pitch P of the metalens 100 may be determined according to process feasibility or design convenience. Thus, the lower limit of the width W of the metalens 100 may be determined according to the minimum processable line width and the minimum distance from adjacent cells. For example, the minimum distance from adjacent cells may be greater than the distance between the pitch P and the width W of the nanostructures NS.

Further, the upper limit of the width W of the metalens 100 may be determined according to design convenience. That is, the design area A2 may be selected according to the upper limit and the lower limit of the pitch P of the nanostructures NS and the upper limit and the lower limit of the width W of the nanostructures NS.

Once the design area A2 has been selected, a search route R within the design area A2 may be defined (or "set") using a phase contour corresponding to the width W of the nanostructures NS and the pitch P of the nanostructures NS (S140).

In the design area A2, the search route R may be set in a direction in which the phase decreases by $2\pi$ starting from the maximum phase value. As described above, when the metalens 100 is designed in the section where the phase profile decreases by $2\pi$ starting from the maximum phase value, other areas may also be designed using the design. Thus, the search route R in which the phase decreases by $2\pi$ starting from the maximum phase value may be set using the phase contour.

Referring to FIG. 11, the phase increases as the width W of the nanostructures NS increases and the pitch of the nanostructures NS decreases. Thus, in the illustrated example of FIG. 11, a smaller thickness of the phase contour indicates a larger phase.

Since the speed of incident light is inversely proportional to a refractive index, the wavelength in the metalens 100 may be inversely proportional to the refractive index of the metalens 100. Accordingly, when the height H of the nanostructures NS is constant, the phase may be proportional to the refractive index of the metalens 100. And the refractive index of the metalens 100 is proportional to the density of the nanostructures NS, and the density of the nanostructures NS is proportional to a square of a ratio between the width W of the nanostructures NS and the pitch P of the nanostructures NS. Therefore, as shown in FIG. 11, the phase increases as the width W of the nanostructures NS increases and the pitch P of the nanostructure decreases.

Referring to FIGS. 10 and 11, in the design area A2, the phase $\phi_{max}$ at a first point 1 is greatest, and the phase $\phi_{min}$ at a fourth point 4 is least. Along a boundary of the design area A2, the phase decreases along the first point 1, the second point 2, the third point 3, and the fourth point 4.

In accordance with a design tool consistent with certain embodiments of the inventive concept, the width W of the nanostructures NS and the pitch P of the nanostructures NS should be continuously changed. Therefore, for example, when the phase $\phi_{max}$ at the first point 1 is greater by $2\pi$ than the phase $\phi_{min}$ at the fourth point 4, a straight line connecting first point 1 to fourth point 4 may be set as the search route R.

Referring to FIGS. 5 and 6, for example, when the first area S1 is designed, the nanostructures NS having the phase $\phi_{max}$ at the first point 1 may be disposed at the center point C of the metalens 100, and the nanostructures NS having the phase $\phi_{min}$ at the fourth point 4 may be disposed at a position furthest from the center point C of the metalens 100 in the first area S1. Also, for example, when the second area S2 is designed, the nanostructures NS having the phase $\phi_{max}$ at the first point 1 may be disposed at a position closest to the center point C of the metalens 100 in the second area S2, and the nanostructures NS having the phase $\phi_{min}$ at the fourth point 4 may be disposed at a position furthest from the center point C of the metalens 100 in the second area S2. Thus, the nanostructures NS having the phase $\phi_{max}$ at the first point 1 may have the pitch P and the width W corresponding to the first point 1, and the nanostructures NS having the phase $\phi_{min}$ at the fourth point 4 may have the pitch P and the width W corresponding to the fourth point 4.

Alternately, referring to FIG. 12, during the step of selecting the design area A2 (S130) in the method of designing metalens according to embodiments of the inventive concept, the search route R within the design area A2 may be set in further consideration of a transmittance reduction area A3.

Figure 13:
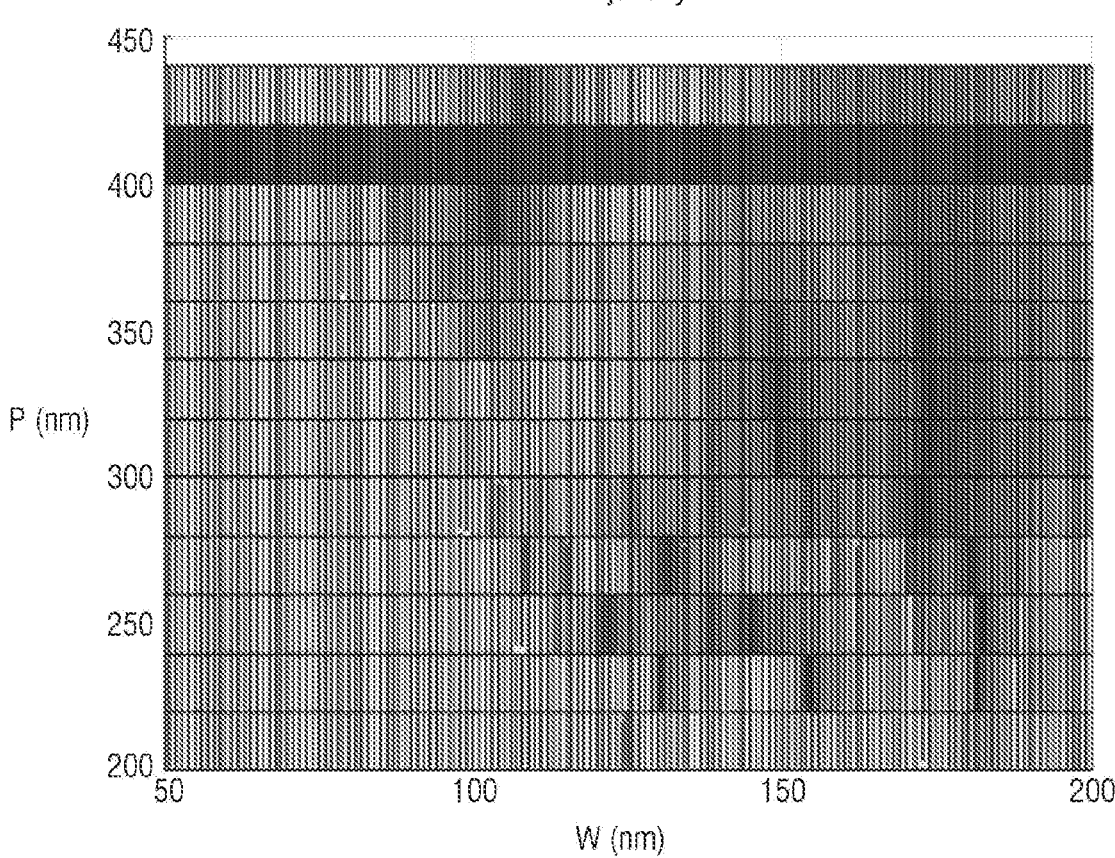
FIGS. 13 and 14 are diagrams illustrating transmittance corresponding to the pitch of the nanostructure and the width of the nanostructure at a specific wavelength.
Figure 14:
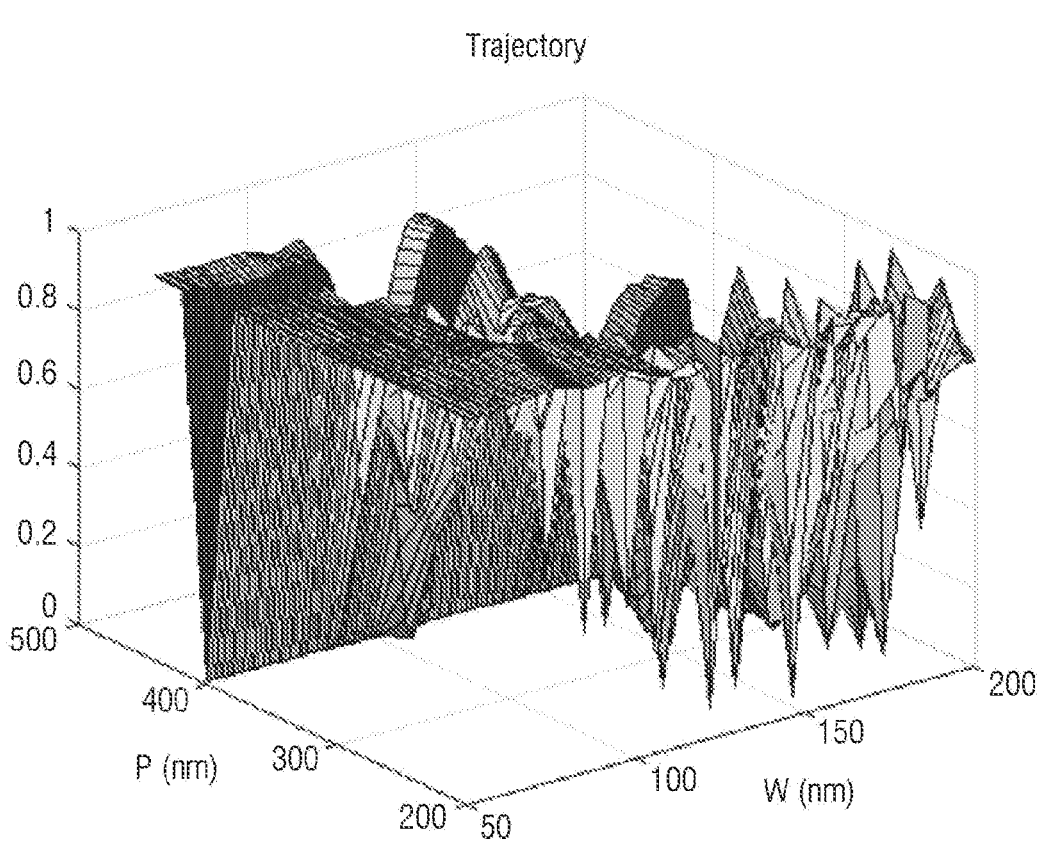

Referring to FIGS. 13 and 14, there may be an area in which the transmittance corresponding to the pitch P and the width W of the nanostructures NS at a specific wavelength decreases rapidly. In FIGS. 13 and 14, the darker shade indicates a lower transmittance. Since the metalens 100 cannot be designed in an area in which transmittance setting conditions are satisfied, that is, in the transmittance reduction area A3 in which the transmittance is less than or equal to a set value, the area may be excluded from the search route R. When the upper limit of the pitch P of the nanostructures NS is set to avoid the transmittance reduction area, the height H of the nanostructures NS may be increased in order to secure the desired phase range. However, in this case, since the aspect ratio has been increased, the overall difficulty of the manufacturing process may be increased. Therefore, it may be necessary to set the search route R in such a manner that the transmittance reduction area A3 is avoided.

Accordingly, the search route R—which avoids the transmittance reduction area A3—may be set within the design area A2. For example, a line connecting the first point 1, the second point 2, the fifth point 5, the sixth point 6, and the fourth point 4 may be set as the search route R. In this case, according to a set offset (OS), a number of search routes may be exist between a search route connecting the fifth point 5 and the sixth point 6 and a search route R' connecting a fifth-prime point 5' and a sixth-prime point 6'. Here, the offset OS may correspond to the offset OS of FIG. 5.

Subsequently, a phase map corresponding to the width W of the nanostructures NS and the pitch P of the nanostructures NS may be generated along the search route R (S150).

Referring to FIG. 5, the phase may have a value that decreases by $2\pi$ from the maximum phase value along the search route R. A point may be selected along the search route R such that the phase decreases by $2\pi$ starting from the maximum phase value. In this case, the phase map may be generated by discovering a point having a maximum transmittance among a number of points having the corresponding phase. The phase map may be generated by discovering a point having a maximum transmittance among a reference point and a number of change points near the reference point along the search route R.

For example, referring to FIG. 15, using figures of merit (FOM) for the change points $P_1(W-dW, P)$, $P_2(W+dW, P)$, $P_3(W, P-dP)$, and $P_4(W, P+dP)$ with respect to a reference point $P_0(W, P)$ on the search route R, a point having a maximum transmittance may be discovered. The change points $P_1(W-dW, P)$, $P_2(W+dW, P)$, $P_3(W, P-dP)$, and $P_4(W, P+dP)$ may be changed from the reference point $P_0(W, P)$ on the search route R by a set pitch dP in a pitch direction $DR_P$ or by a set width dW in a width direction $DR_W$.

As another example, referring to FIG. 16, using figures of merit (FOM) for the change points $P_1(W-dW, P-dP)$, $P_2(W+dW, P-dP)$, $P_3(W-dW, P+dP)$, and $P_4(W+dW, P+dP)$ with respect to a reference point $P_0(W, P)$ on the search route R, a point having a maximum transmittance may be discovered. The change points $P_1(W-dW, P-dP)$, $P_2(W+dW, P-dP)$, $P_3(W-dW, P+dP)$, and $P_4(W+dW, P+dP)$ may be changed from the reference point $P_0(W, P)$ on the search route R by the set pitch dP in the pitch direction $DR_P$ or by the set width dW in the width direction $DR_W$.

Figure 17:
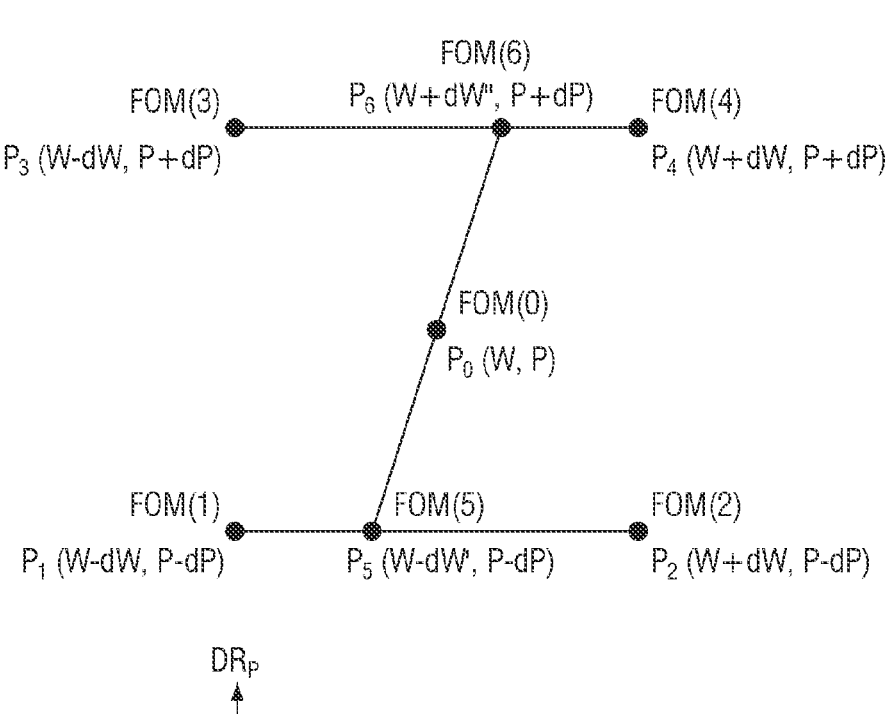

As another example, referring to FIG. 17, using figures of merit (FOM) for the change points $P_1(W-dW, P-dP)$, $P_2(W+dW, P-dP)$, $P_3(W-dW, P+dP)$, $P_4(W+dW, P+dP)$, $P_5(W-dW', P-dP)$, and $P_6(W+dW'', P+dP)$ with respect to a reference point $P_0(W, P)$ on the search route R, a point having a maximum transmittance may be discovered. The change points $P_1(W-dW, P-dP)$, $P_2(W+dW, P-dP)$, $P_3(W-dW, P+dP)$, and $P_4(W+dW, P+dP)$ may be changed from the reference point $P_0(W, P)$ on the search route R by the set pitch dP in the pitch direction $DR_P$ or by the set width dW in the width direction $DR_W$. The change points $P_5(W-dW', P-dP)$ and $P_6(W+dW'', P+dP)$ may have the same phase as the reference point $P_0(W, P)$ and may be changed by the set pitch dP from the reference point $P_0(W, P)$ in the pitch direction $DR_P$.

With regard to the going, a figure of merit (FOM) may be defined in accordance with Equation 3 that follows:

$$FOM = \mathrm{Re}\left[\sum_{i=1}^{N} T_i \cdot \exp(-j\phi_i)\right]\Big/ N - \qquad \text{[Equation 3]}$$
$$\mathrm{Re}\left[\sum_{i=1}^{N} M_i \exp(j\phi_i) \cdot \exp(-j\phi_{target,i})\right]\Big/ N -$$
$$\mathrm{Re}\left[\sum_{i=1}^{N} M_i \exp(j\phi_i - \phi_{target,i})\right]\Big/ N$$

Here, in the context of the variable $T_i = M_i \exp(j\phi_i)$, $T_i$ is transmissivity, $M_i$ is a transmittance coefficient, $\phi_i$ is a phase at a corresponding point, $\phi_{target,i}$ is a target phase, wherein 'N' is a number of wavelengths for which simulation is performed. The target phase refers to a phase profile within a phase range in which a phase decreases by $2\pi$ starting from the maximum phase value of FIG. 5. Here, the target phase may be the phase of the reference point on the search route R because the search route R is selected such that the phase decreases by $2\pi$ starting from the maximum phase value.

When the target phase and the phase at the corresponding point are the same, the figure of merit (FOM) is the average of transmission coefficients. When the target phase and the phase at the corresponding point are different, the figure of merit (FOM) is reduced by a difference between the target phase and the phase at the corresponding point. Therefore, an optimal point may be selected based on transmittance and consistency between the target phase and the phase at the corresponding point using the figure of merit (FOM).

For example, when a point at the phase is $\phi_i$ is discovered, an optimal point in which the phase is $\Pi_i$ may be selected by calculating the figure of merit (FOM) at the reference point on the search route R in which the phase is $\phi_i$ and the figure of merit (FOM) at the change points, such as in FIG. 15, with respect to the reference point. Subsequently, a point at which the phase is $\phi_i \, d\phi$ may be discovered. By repeating NS corresponding to the phase decreasing by $2\pi$ from the maximum phase value may be selected to generate a phase map.

Figure 18:
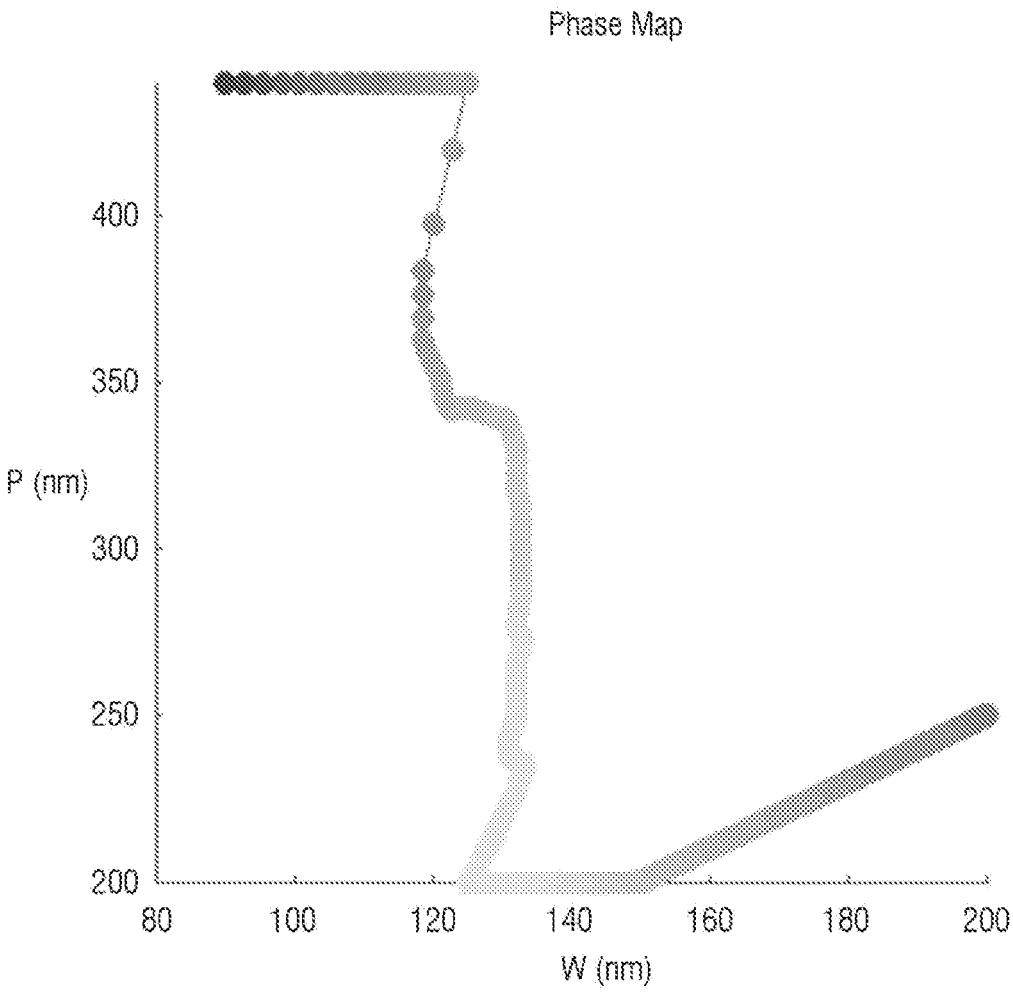
FIG. 18 is a diagram illustrating a phase map of the width and pitch of a nanostructure.

Referring to FIG. 18, the phase map of the width W of the nanostructures NS and the pitch P of the nanostructures NS may be generated according to the search route R on the basis of the FOM. In FIG. 18, a deeper concentration indicates a lower phase. In this case, an optimal offset may be determined by generating a phase map along a plurality of search routes R and R'.

Once the phase map has been generated, the metalens 100 may be designed using the phase map and the target phase corresponding to the distance from the center point of the metalens (S160).

Figure 19:
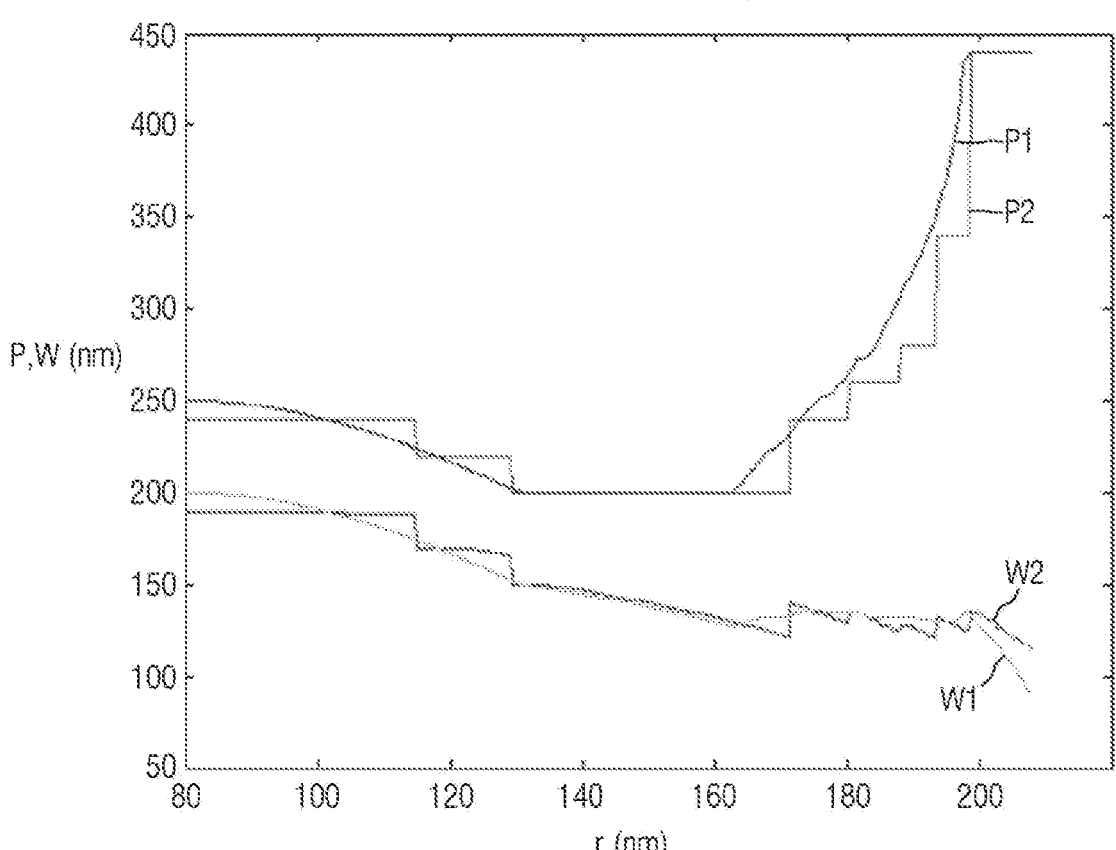
FIGS. 19, 20 and 21 are respective conceptual diagrams further illustrating the design of a metalens.
Figure 20:
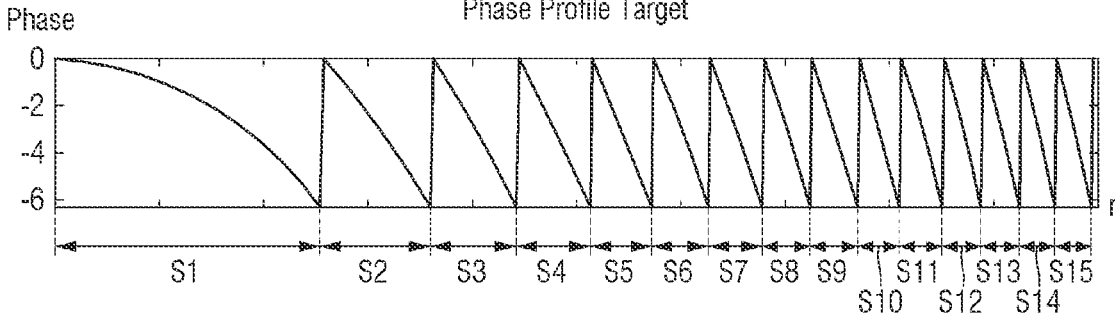

Referring to FIG. 20, the target phase corresponding to the distance r from the center point C of the metalens 100 is shown. Analogous to the example of FIG. 5, the metalens 100 may, instead, include areas S1 to S15 in which the phase corresponding to the distance 'r' from the center point 'C' of the metalens 100 decreases by 2π starting from the maximum phase value in the section S1 to S15. Hence, the illustrated example of FIG. 20 shows all phases of FIG. 5 in the same phase range by dividing all the phases into a number of sections each having a phase in the range of 2π and shifting the phase value of each section by an integer multiple of 2π. Although the maximum phase value is shown as 0 in FIG. 20, the inventive concept is not limited thereto. The maximum phase value may have various values, and the minimum phase value may have a value smaller than the maximum phase value by 2π. For example, the second, third and fourth areas S2, S3, and S4 of FIG. 5 may correspond to the second, third and fourth areas S2, S3, and S4 of FIG. 20. Therefore, as shown in FIG. 19, when the pitch P of the nanostructures NS and the width W of the nanostructures NS corresponding to the distance 'r' from the central point 'C' of the metalens 100 are extracted from each of the areas Si to S15, the metalens 100 may be designed for another area on the basis of the extracted pitch P and the extracted width W.

Figure 21:
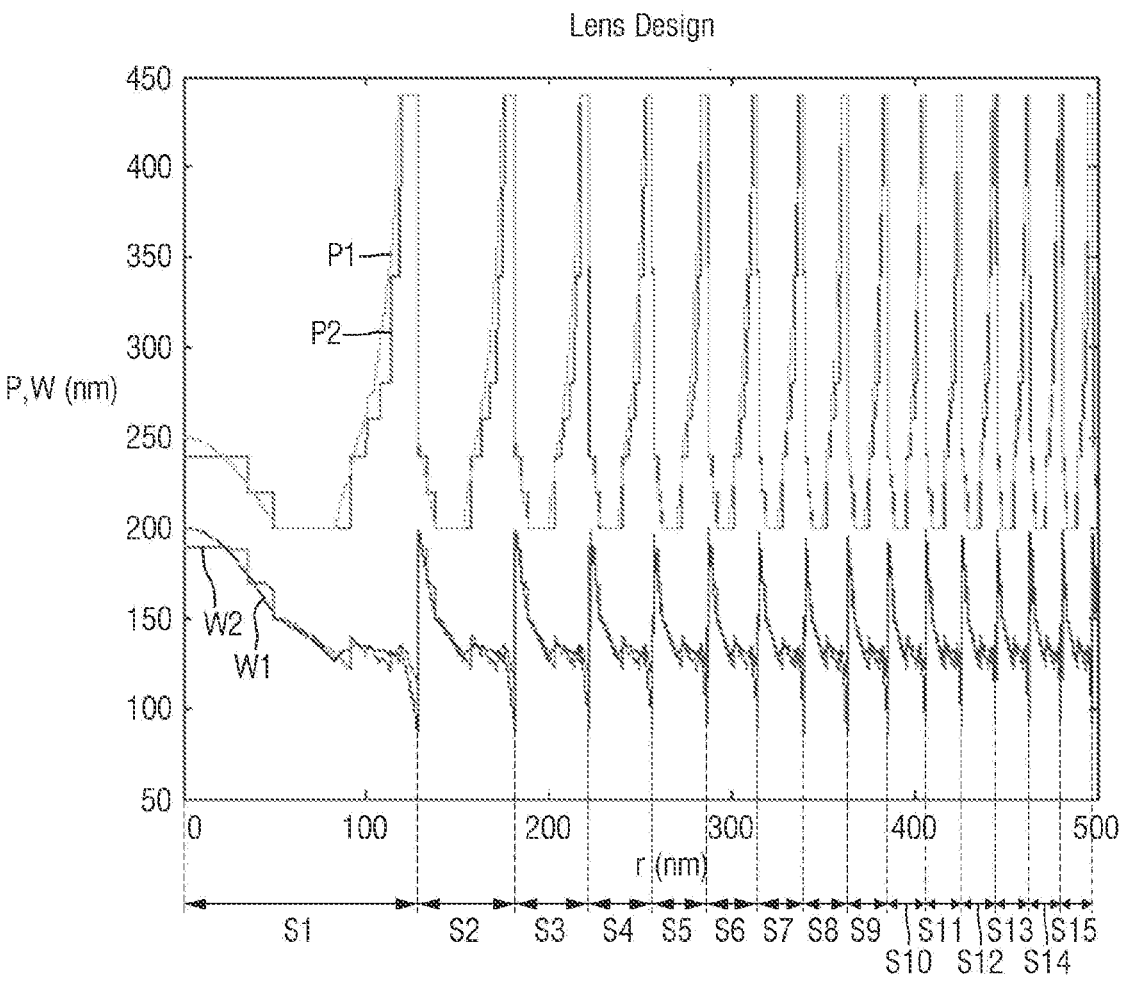

For example, when the pitch P of the nanostructures NS and the width W of the nanostructures NS corresponding to the distance 'r' from the central point 'C' of the metalens 100 shown in FIG. 19 are shown for the first area S1, the phase range in which the phase decreases by 2π starting from the maximum phase value may be repeated, and thus using the repeated phase range, the metalens 100 may be designed for the other areas S2 to S15, as shown in FIG. 21.

Referring to FIG. 19, the pitch P of the nanostructures NS and the width W of the nanostructure corresponding to the distance 'r' from the center point 'C' of the metalens 100 may be extracted in the section in which the phase decreases by 2π starting from the maximum phase value from the phase map of FIG. 18 and the target phase corresponding to the distance r from the center point C of the metalens 100 of FIG. 20. The width W of the nanostructure and the pitch P of the nanostructure having a target phase decreasing by 2π starting from the maximum phase value may be extracted from the phase map. Thus, the metalens 100 may be designed by arranging (or placing) nanostructures having an extracted width and an extracted pitch in relation to the metalens 100 and corresponding to the target phase (e.g., a position at the distance 'r' from the center point 'C' of the metalens 100). Referring to FIG. 21, the metalens 100 may be designed for the other areas using this approach.

It has been noted above that a metalens may be designed by constructing a database that correlates the phase with the width W of nanostructures NS and the pitch P of nanostructures NS. Once this database has been constructed, it is a fairly simple to select a width W and a pitch of the nanostructures NS for a phase corresponding to the distance 'r' from the center point 'C' of the metalens. However, this approach requires that phases across an entire range of widths W and pitches P for the nanostructures NS be calculated in order to construct the database. Accordingly, this approach requires a great deal of time and effort.

Further, when a constituent material of the metalens changes, or a range of wavelengths associated with the metalens changes, phase(s) corresponding to particular width(s W and/or pitch(es) P of the nanostructures NS also change. Accordingly, the database must be completely reconstructed before a phase may be accurately recalculated.

In great contrast, using metalens design methods according to embodiments of the inventive concept, the width W of nanostructures NS and the pitch P of the nanostructures NS may be determined along a search route R, without necessarily calculating phases over an entire range of widths W and/or an entire range of pitches P for the nanostructures NS. That is, a metalens may be readily designed using a method according to the inventive concept without first constructing a database. Accordingly, this approach greatly improves the efficiency of metalens design. Further, even if a constituent material of a metalens changes, or a manufacturing process used to manufacture the metalens changes, or a range of wavelengths associated with the metalens changes—the metalens may nonetheless be quickly and accurately redesigned without necessary recourse to a database.

Figure 22:
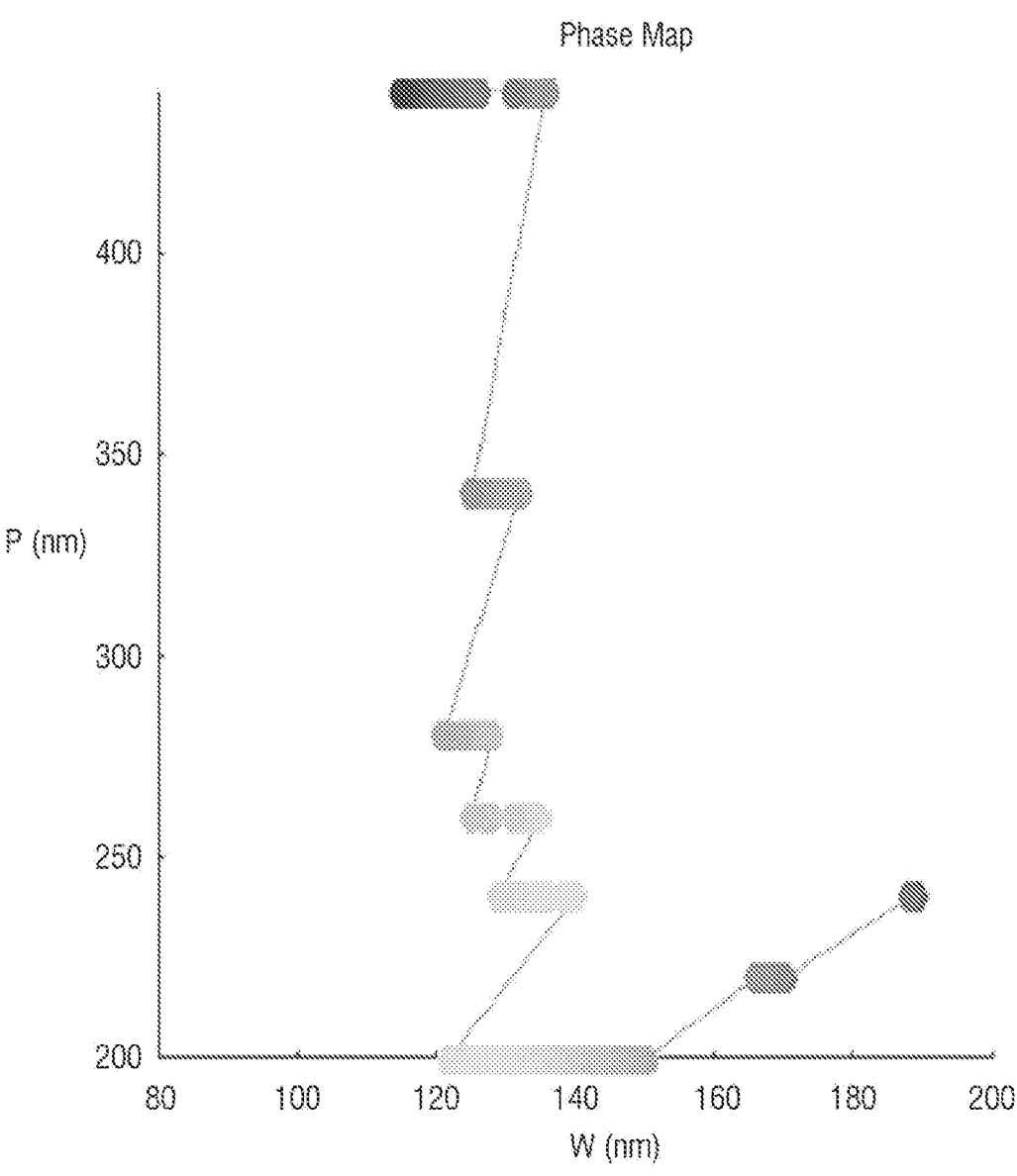
FIG. 22 is a diagram illustrating a phase map defined in relation to the width and pitch of a nanostructure.

FIG. 22 illustrates a phase map generated through the use of a database. Referring to FIG. 22 and extending by way of comparison the foregoing working examples, a phase map corresponding to the width W of nanostructures NS and the pitch P of nanostructures NS and generated in accordance with an embodiment of the inventive concept is more readily useful when compared with a phase map corresponding to the width W of the nanostructures NS and the pitch P of the nanostructure and derived from a database. For example, when a first metalens having a first width $W_1$ and a pitch P must be replaced in an overall design with a second metalens having a second width $W_2$ and the pitch P, the conventionally-provided, database approach proves inefficient. In contrast, metalens design methods and systems according to embodiments of the inventive concept provide a highly efficient design approach, and improved metalens designs.

Figure 23:
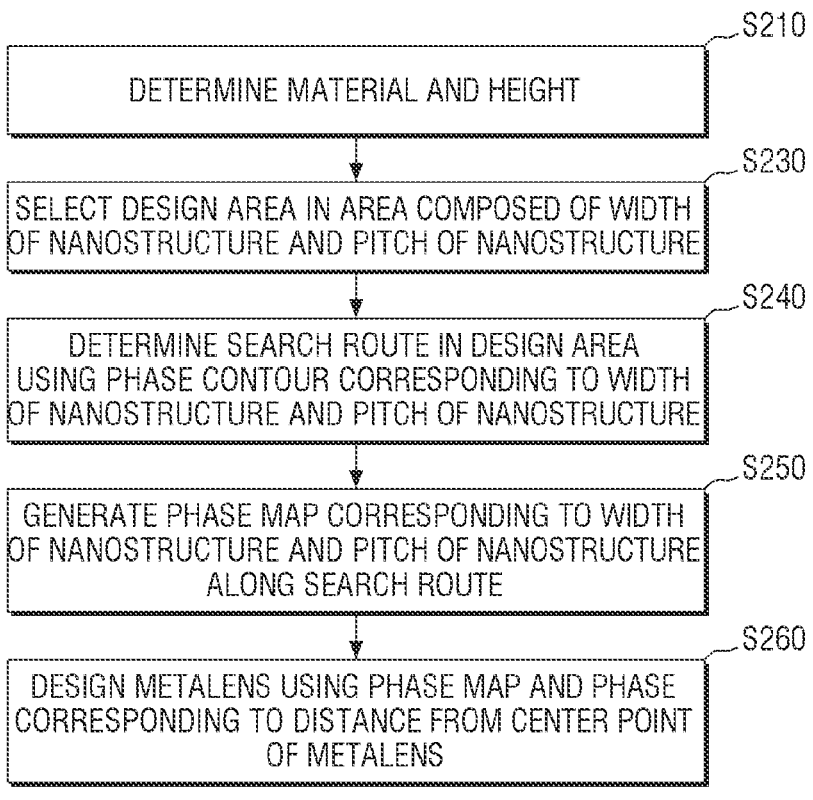
FIG. 23 is a flowchart illustrating a method of designing a metalens with multiple layers according to embodiments of the inventive concept.
Figure 24:
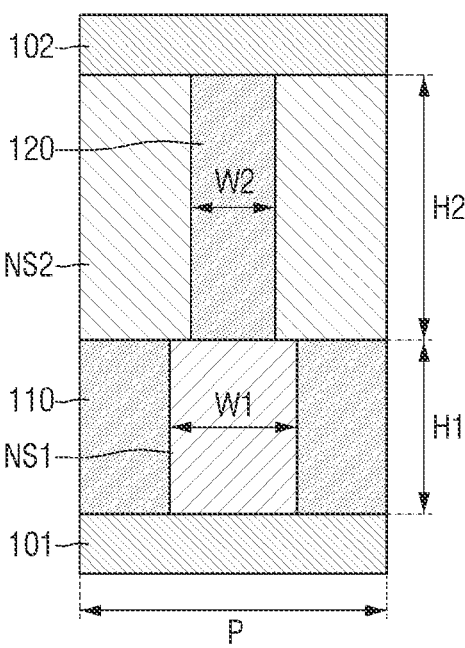
FIGS. 24, 25 and 26 are conceptual diagrams further illustrating the design of a metalens.
Figure 25:
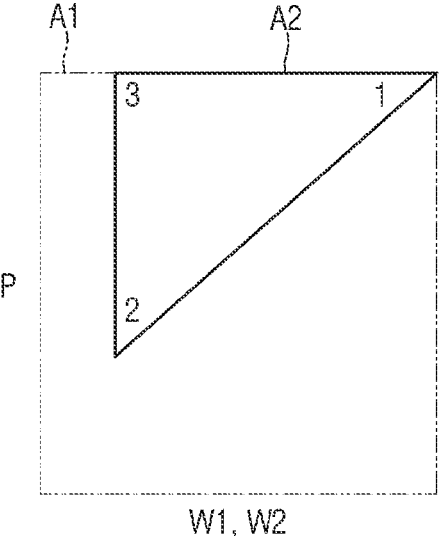
Figure 26:
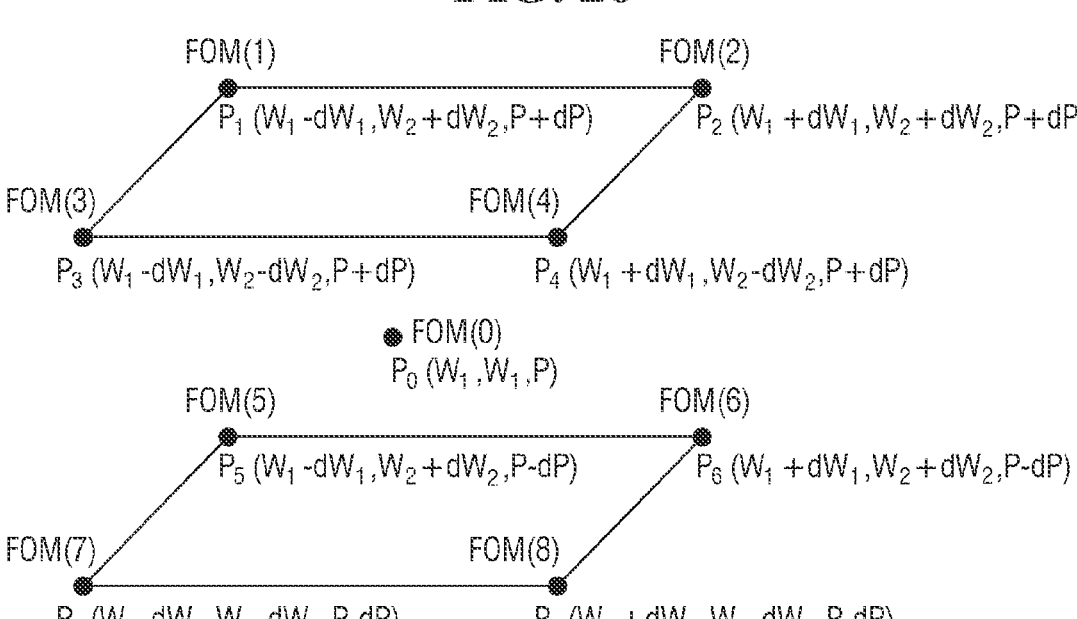
Figure 27:
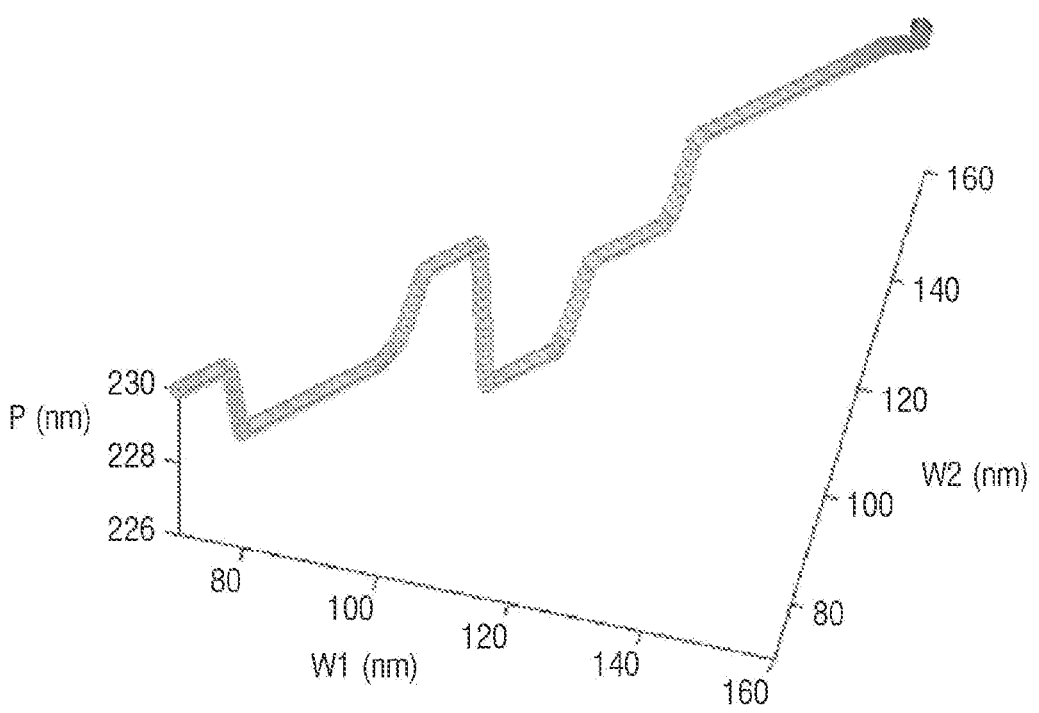
FIG. 27 is a diagram showing transmittance corresponding to the width and pitch of a nanostructure at a specific wavelength.
Figure 28:
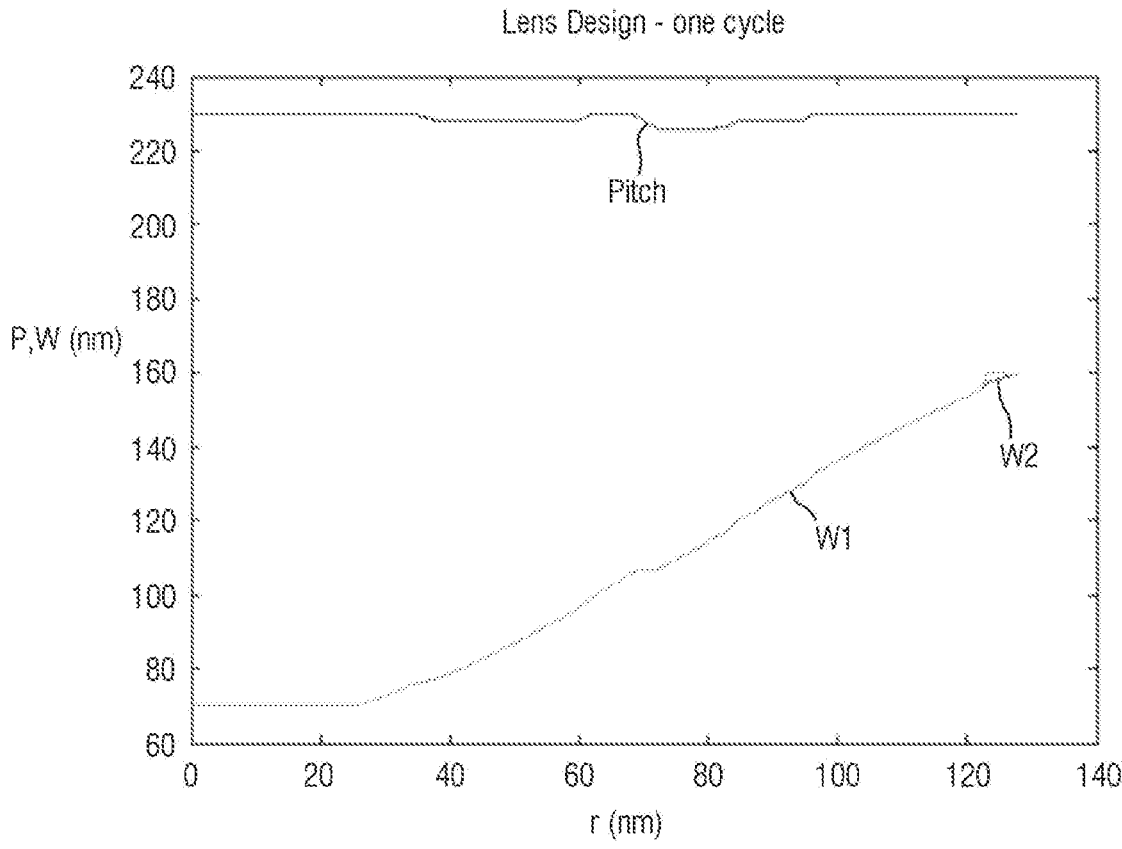
FIGS. 28 and 29 are respective conceptual diagrams illustrating the design of a metalens.
Figure 29:
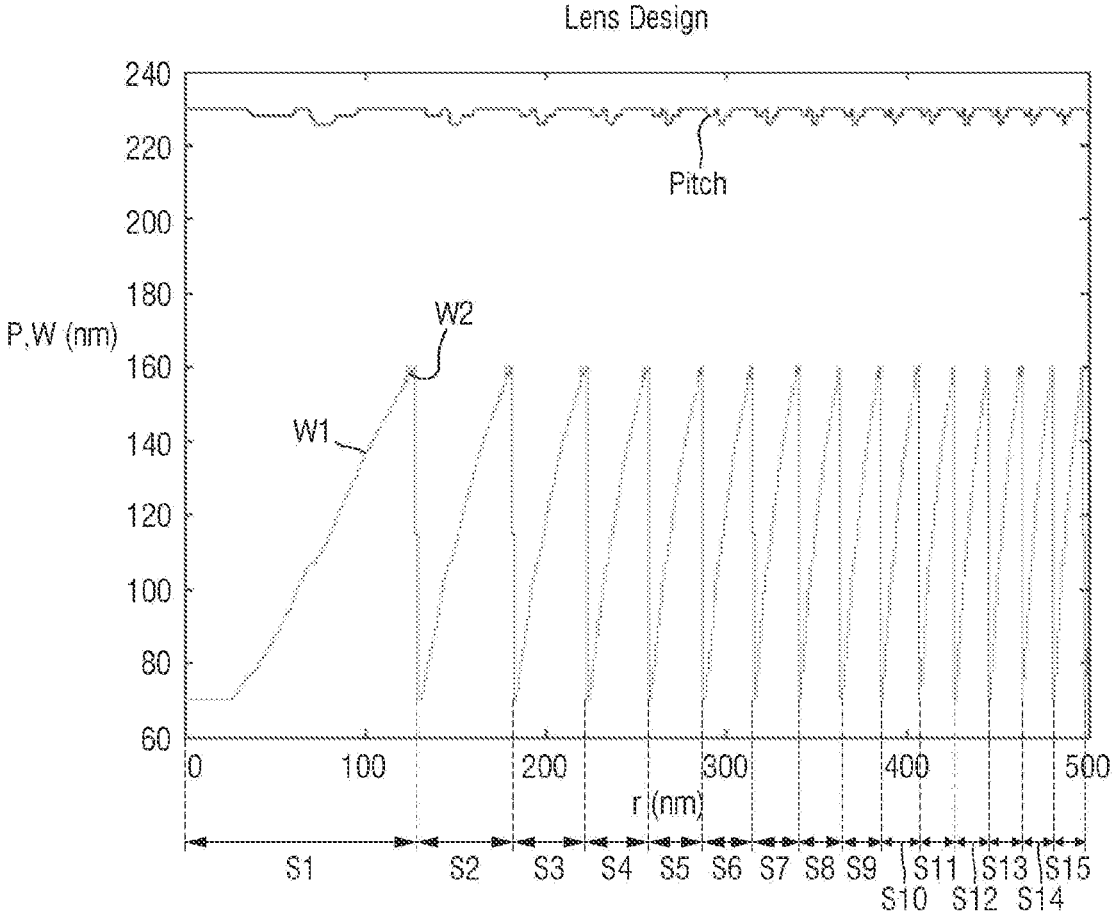

FIG. 23 is a flowchart illustrating a method of designing a metalens with multiple layers according to embodiments of the inventive concept, and may be performed by the system of FIG. 1. FIG. 24 is a conceptual diagram illustrating, in part, an exemplary metalens. FIG. 25 is a conceptual diagram illustrating a design area within and an available area defined in terms of width and pitch of a nanostructure. FIG. 26 is a conceptual diagram illustrating a reference point and change points. FIG. 27 is a diagram illustrating transmittance corresponding to the width and pitch of a nanostructure in relation to a specific wavelength. FIGS. 28 and 29 are respective graphs further illustrating metalens design.

Referring to FIGS. 23 and 24, a constituent material of the metalens 100, as well as heights H1 and H2 of the metalens 100 may be determined (S210).

Here, it is assumed as a working example that the metalens 100 includes a first layer and a second layer, however those skilled in the art will appreciate that the metalens may include 3 or more layers. Accordingly, the first layer of the metalens 100 may include first nanostructures NS1 and a first spacer layer 110, and the second layer of the metalens 100 may include second nanostructures NS2 and a second spacer layer 120. Thus, in the foregoing method step, respective material(s) for the first nanostructures NS1, first spacer layer 110, second nanostructures NS2, and second spacer layer 120, as well as the first height H1 of the first nanostructures NS1, and the second height H2 of the second nanostructures NS2 may be determined. Here, it is further assumed that the first nanostructures NS1 and the second nanostructures NS2 have substantially the same pitch.

It is still further assumed that an optimal combination of materials for the metalens 100 having the first and second heights H1 and H2 may be determined using a Bayesian optimization approach.

In some embodiments, a nanostructure for each of the first and second layers of the metalens 100 may have an embossed shape or an engraved shape. Thus, for example, the nanostructure may have an embossed columnar shape, or an engraved shape that fills through-hole(s) in a spacer layer.

Referring to FIG. 24, the first nanostructures NS1 of the metalens 100 may have an embossed shape, and the second nanostructures NS2 of the metalens 100 may have an engraved shape. Engraved nanostructures have characteristics in which an offset variation is small and is opposite in direction, as compared with embossed nanostructures. Therefore, a metalens including a layer including a tall engraved nanostructure and a layer including a small embossed nanostructure can be used to compensate (or cancel) offset variations, thereby providing a more constant offset over an entire design area.

Referring to FIG. 25, a designable design area A2 may be selected from an available area A1 defined (or composed) in relation to the first and second widths $W_1$ and $W_2$ of the nanostructures NS1 and NS2, as well as the pitch P of the first and second nanostructures NS1 and NS2 (S230).

In this regard, the design area A2 may be selected in accordance with process feasibility and/or design convenience. The first and second widths $W_1$ and $W_2$ of the first and second nanostructures NS1 and NS2 may have the same range. Thus, in the illustrated example of FIGS. 24 and 25, the first and second widths $W_1$ and $W_2$ of the first and second nanostructures NS1 and NS2 are used to define the design area A2. That is, the design area A2 may be selected from the available area A1 in relation to the first width $W_1$ of the first nanostructures NS1, the second width $W_2$ of the second nanostructures NS2, and the pitch P of both the first and second nanostructures NS1 and NS2.

Subsequently, a search route R in the design area A2 may be set using phase contour(s) corresponding to the first and second widths $W_1$ and $W_2$ of the first and second nanostructures NS1 and NS2 and the pitch P of the first and second nanostructures NS.

In this regard, a phase map corresponding to the first and second widths $W_1$ and $W_2$ of the first and second nanostructures NS1 and NS2 and the pitch P of the first and second nanostructures NS1 and NS2 may be generated along the search route R (S250).

A point may be selected along the search route R, at which the phase has decreased by $2\pi$ from a maximum phase value. In this case, the phase map may be generated by determining (or discovering) a point having a maximum transmittance among a plurality of points having the corresponding phase. Thus, the phase map may be generated by discovering a point having a maximum transmittance along the search route R among a reference point and a plurality of change points near the reference point.

For example, referring to FIG. 26, using figures of merit (FOM) for a plurality of change points $P_1(W_1-dW_1, W_2+dW_2, P+dP)$, $P_2(W_1+dW_1, W_2+dW_2, P+dP)$, $P_3(W_1-dW_1, W_2-dW_2, P+dP)$, $P_4(W_1+dW_1, W_2-dW_2, P+dP)$, $P_5(W_1-dW_1, W_2+dW_2, P-dP)$, $P_6(W_1+dW_1, W_2+dW_2, P-dP)$, $P7(W_1-dW_1, W_2-dW_2, P-dP)$, and $P8(W_1+dW_1, W_2-dW_2, P-dP)$ with respect to a reference point $P_0(W_1, W_2, P)$ on the search route R, a point having a maximum transmittance may be discovered. The plurality of change points $P_1(W_1-dW_1, W_2+dW_2, P+dP)$, $P_2(W_1+dW_1, W_2+dW_2, P+dP)$, $P_3(W_1-dW_1, W_2-dW_2, P+dP)$, $P_4(W_1+dW_1, W_2-dW_2, P+dP)$, $P_5(W_1-dW_1, W_2+dW_2, P-dP)$, $P_6(W_1+dW_1, W_2+dW_2, P-dP)$, $P7(W_1-dW_1, W_2-dW_2, P-dP)$, and $P8(W_1+dW_1, W_2-dW_2, P-dP)$ may be changed from the reference point $P_0(W_1, W_2, P)$ on the search route R by a set pitch dP in a pitch direction, by a first set width $dW_1$ in a first width direction, or by a second set width $dW_2$ in a second width direction.

Referring to FIG. 27, a phase map corresponding to the first width $W_1$ of the first nanostructures NS1, the second width $W_2$ of the second nanostructures NS2, and the pitch P of both the first and second nanostructures NS1 and NS2 may be generated along the search route R on the basis of the FOM. With respect to FIG. 27, a deeper line density indicates a lower phase.

With the phase map completed, the metalens 100 may be designed using the phase map and the phase corresponding to a distance from a center point 'C' of the metalens (S260).

Referring to FIG. 28, the first width $W_1$ of the first nanostructures NS1, the second width $W_2$ of the second nanostructures NS2, and the pitch P of the first and second nanostructures NS1 and NS2 corresponding to the distance 'r' from the center point 'C' of the metalens 100 may be extracted from the section in which the phase decreases by $2\pi$ from the maximum phase value of the phase map of FIG. 27. Thus, the metalens 100 having an area in which a phase range decreases by $2\pi$ from the maximum phase value may be designed.

Referring to FIG. 29 in the context of the foregoing example, by using the method of designed metalens 100 according to embodiments of the inventive concept, other or additional metalens 100 may be designed in relation to a remaining area within the available area.

Figure 30:
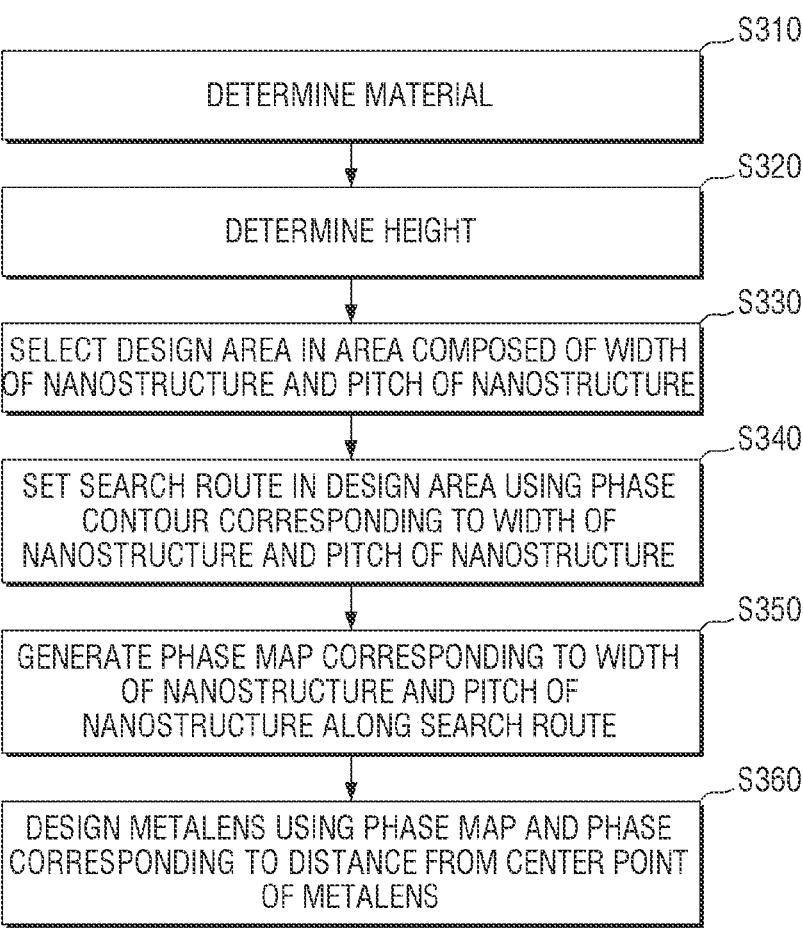
FIG. 30 is a flowchart illustrating a method of designing a metalens with multiple layers according to embodiments of the inventive concept.

FIG. 30 is a flowchart illustrating another method of designing a metalens with multiple layers according to embodiments of the inventive concept. Only material differences between the method of FIG. 23 will be emphasized, and the method may be performed by the system of FIG. 1.

Referring to FIG. 30, constituent material(s) of a metalens may be determined (S310). For example, an optimal combination of materials for the first nanostructures NS1, the first spacer layer 110, the second nanostructures NS2, and the second spacer layer 120 may be found using a Bayesian optimization approach.

Subsequently, from the combination of materials determined in method step S310, (e.g.,) first and second heights H1 and H2 of the metalens may be determined (S320). For example, for a metalens having an optimal combination of materials based on Bayesian optimization, an optimal combination of the first and second heights H1 and H2 may be determined. The time required to determine the first and second heights H1 and H2 may be reduced after the combination of materials for the metalens has been determined, as compared with an approach wherein an optimal combination is determined using as parameters, the materials of the metalens having the first and second heights H1 and H2.

Hereafter, method steps S330, S340, S350 and S360 of the embodiment illustrated in FIG. 30 may correspond respectively with method steps S230, S240, S250 and S260 the embodiment illustrated in FIG. 23.

FIGS. 31, 32, 33 and 34 are respective diagrams illustrating a method of designing a multi-layer metalens according to embodiments of the inventive concept.

Figure 31:
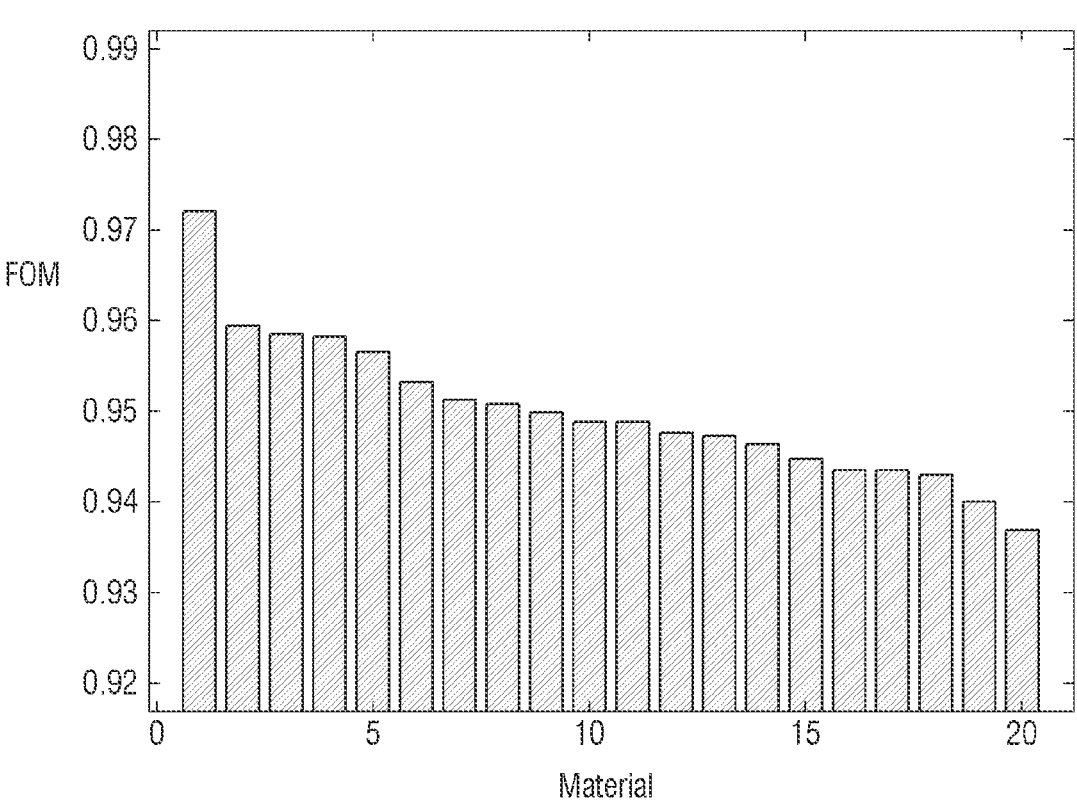
FIGS. 31, 32, 33 and 34 are diagrams further illustrating a method of designing a multi-layer metalens according to embodiments of the inventive concept.

Referring to FIG. 31, an optimal combination of materials of the layers for a three-layer metalens may be determined, using (e.g.,) a highest figure of merit (FOM) and a Bayesian optimization approach.

Figure 32:
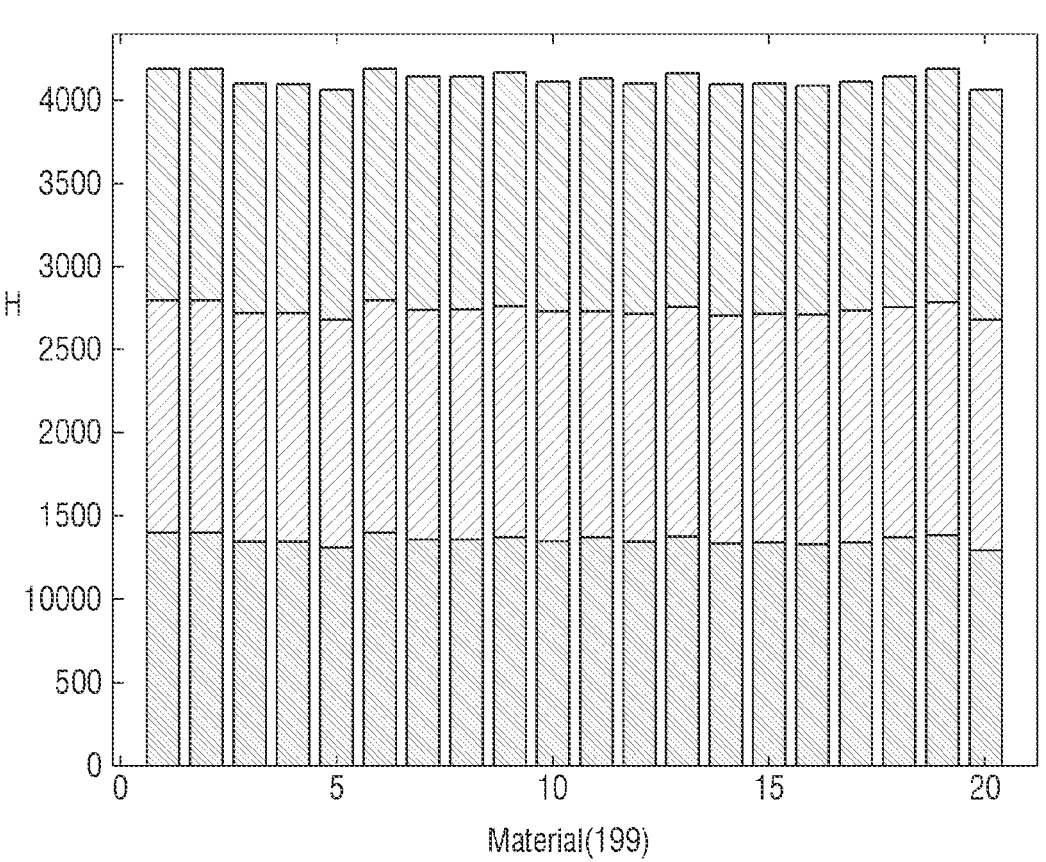

Referring to FIG. 32, from a selected combination of materials 199 of FIG. 31, an optimal combination of heights H of the layers may be determined. In FIG. 32, the three (3) different materials layers are marked with three (3) different hatching marks.

Figure 33:
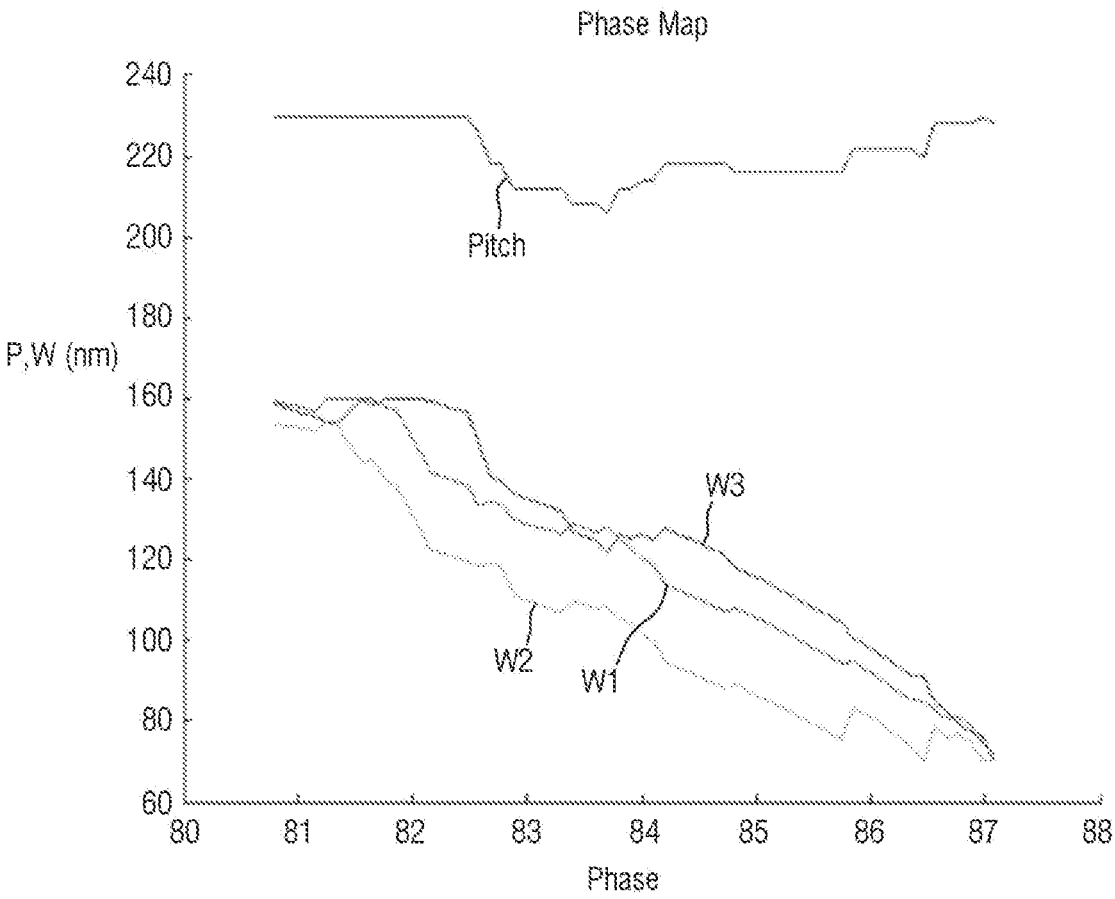

Referring to FIG. 33, and consistent with the foregoing example, by selecting a design area and setting a search route in the design area, a phase map corresponding to the widths W1, W2, and W3 of first, second and third nanostructures, as well as the pitch P of the first, second and third nanostructures for each layer may be generated.

Figure 34:
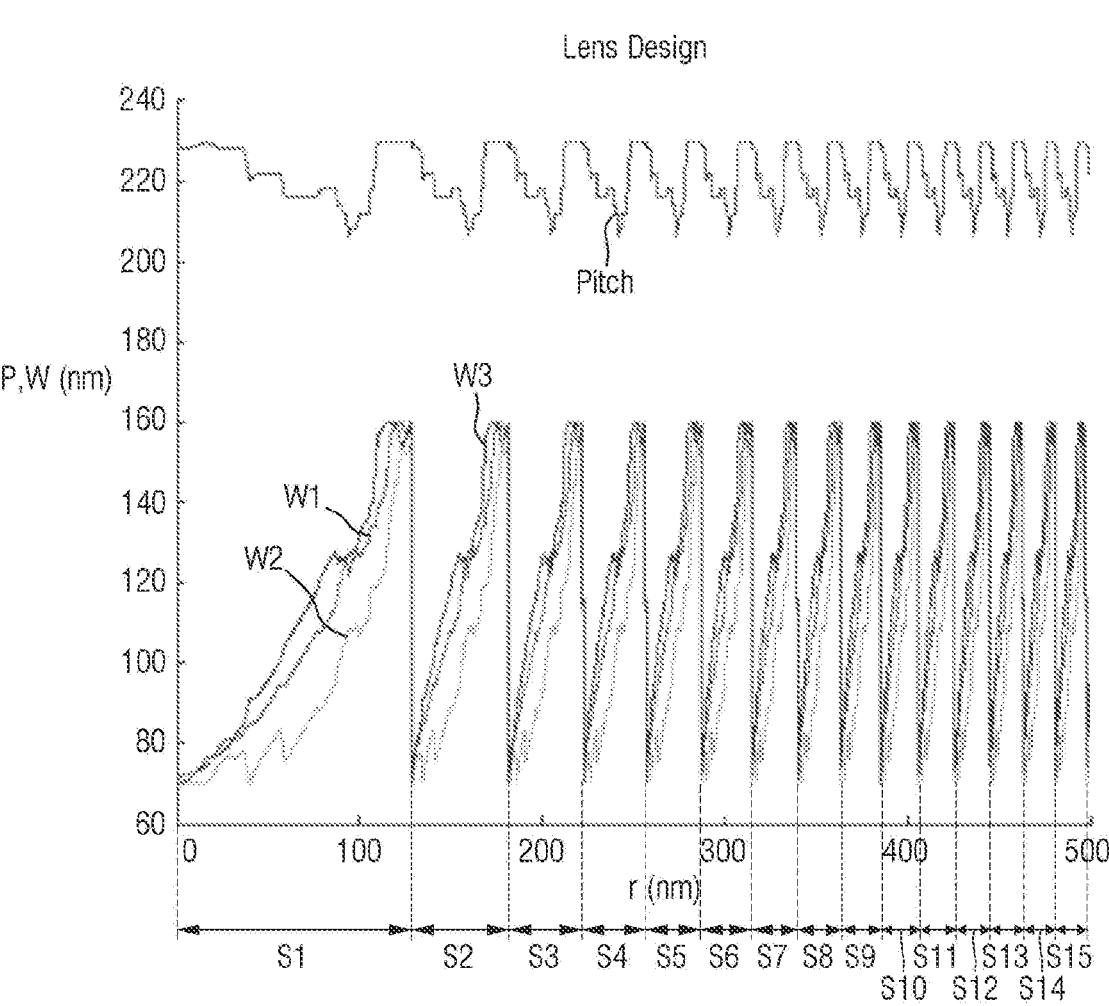

Referring to FIG. 34, and consistent with the foregoing example, the metalens may be designed using the phase map of FIG. 33 and the target phase corresponding to the distance from the center point of the metalens of FIG. 20.

Figure 35:
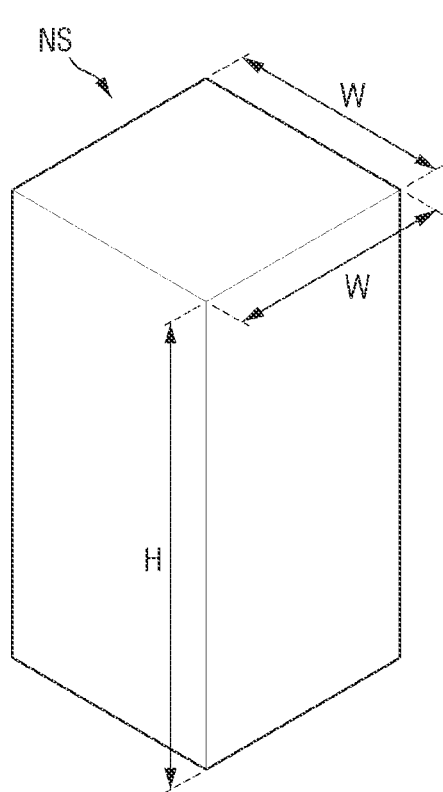
FIGS. 35 and 36 are perspective diagrams illustrating exemplary shapes of nanostructures for a metalens according to embodiments of the inventive concept.
Figure 36:
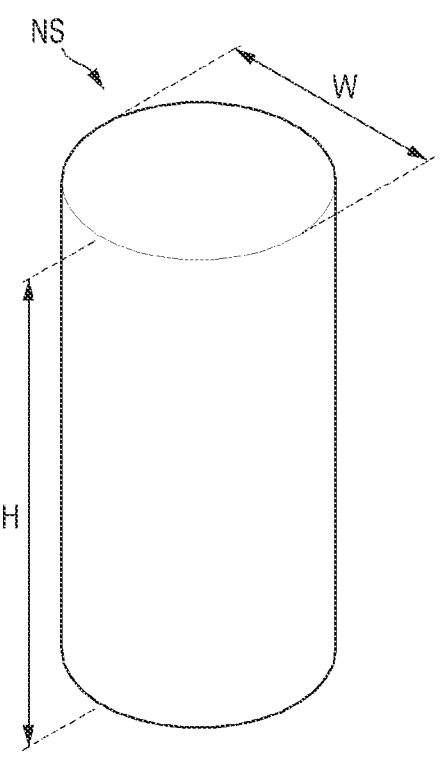

FIGS. 35 and 36 are perspective diagrams illustrating exemplary shapes that may be used in the definition of nanostructures NS for a metalens according to embodiments of the inventive concept.

Referring to FIG. 35, the nanostructures NS may have a square column shape defined by a square cross-section (e.g., W×W) and a height H. Here, the height of the nanostructure NS may correspond to a width in the previously described nanostructures. Alternately, the nanostructures NS may be defined by a columnar shape and various polygonal or elliptical cross-sectional shapes.

Referring to FIG. 36, the nanostructures NS may have a cylindrical shape defined by a cross-sectional diameter W and a height H.

Although the exemplary embodiments of the inventive concept have been described above with reference to the accompanying drawings, the inventive concept is not limited to and various modifications and alterations may be made thereto without departing from the scope of the inventive concept, as defined by the following claims.

What is claimed is:

1. A metalens design system comprising:
a memory storing a design tool; and
a processor configured to execute the design tool to design a metalens including nanostructures and a spacer layer between the nanostructures,
wherein the design tool is configured to:
select, from an available range of widths of a nanostructure and pitches of the nanostructure, a design range of the widths of the nanostructure and the pitches of the nanostructure;
set a search route in the design range using a phase contour corresponding to the widths of the nanostructure and the pitches of the nanostructure;
generate a phase map indicating a selected portion of the design range;
based on the phase map, determine a target width of the nanostructure and a target pitch of the nanostructure that provide a target phase corresponding to a distance from a center point of the metalens; and
place the nanostructure having the target width and the target pitch at a position of the metalens corresponding to the target phase.

2. The metalens design system of claim 1, wherein the design tool is configured to set the search route in the design range in a direction providing a $2\pi$ decrease in phase.

3. The metalens design system of claim 2, wherein the design tool is configured to:

divide the metalens into a plurality of areas satisfying a phase range condition using the target phase corresponding to the distance from the center point of the metalens; and
generate the phase map for at least one of the plurality of areas,
wherein the phase range condition provides for a $2\pi$ phase decrease from a maximum phase value for each of the plurality of areas in relation to the distance from the center point of the metalens.

4. The metalens design system of claim 3, wherein the design tool is configured to:
design a first nanostructure design for a first area among the plurality of areas based on the phase map and the target phase corresponding to the distance from the center point of the metalens; and then,
design a second nanostructure design for a second area among the plurality of areas based on the first nanostructure design.

5. The metalens design system of claim 3, wherein the plurality of areas includes a first area having a circular shape and including the center point of the metalens, a second area having an annular shape surrounding the first area.

6. The metalens design system of claim 1, wherein the design range includes a transmittance reduction range in which transmittance satisfies a set condition, and
wherein the design tool is configured to set the search route such that the search route does not pass through the transmittance reduction range.

7. The metalens design system of claim 1, wherein the design tool is configured to:
calculate transmittances of light passing through the metalens along the search route as a function of the widths of the nanostructure and the pitches of the nanostructure; and
generate the phase map based on the transmittances.

8. The metalens design system of claim 1, wherein the target phase corresponding to the distance from the center point of the metalens has an offset.

9. The metalens design system of claim 8, wherein the design tool is configured to set a plurality of search routes based on the offset.

10. The metalens design system of claim 1, wherein the nanostructure has a columnar shape.

11. The metalens design system of claim 1, wherein the spacer layer includes a through-hole, and the nanostructure fills the through-hole.

12. The metalens design system of claim 11, wherein a shape of the nanostructure is a cylindrical column or a polygonal column.

13. A method of designing a metalens including nanostructures and a spacer layer between the nanostructures, the method comprising:
selecting a design range of widths of a nanostructure and pitches of the nanostructure;
setting a search route in the design range in a direction in which a phase decreases;
calculating transmittances at a reference point on the search route and at change points near the reference point;
based on the transmittances, generating a phase map indicating a selected portion of the design range;
based on the phase map, determining a target width and a target pitch that provide a target phase; and
placing the nanostructure having the target width and the target pitch.

14. The method of claim 13, wherein the setting of the search route in the design range in the direction in which the phase decreases provides for a $2\pi$ decrease in phase.

15. The method of claim 13, wherein the change points include a first change point changed by a set pitch from the reference point, and a second change point changed by a set width from the reference point.

16. The method of claim 15, wherein the change points further include a third point changed by the set pitch and the set width from the reference point.

17. The method of claim 15, wherein the change points further include a third point changed by the set pitch from the reference point and having a same phase as the reference point.

18. A method of designing a metalens including a nanostructure and a spacer layer, the method comprising:

determining a material of the nanostructure, a material of the spacer layer, and a height of the nanostructure;

selecting, from an available range of widths of the nanostructure and pitches of the nanostructure, a design range of the widths of the nanostructure and the pitches of the nanostructure;

setting a search route in the design range in a direction providing a $2\pi$ phase decrease from a maximum phase value in the design range using a phase contour corre-sponding to the widths of the nanostructure and the pitches of the nanostructure;

generating a phase map indicating a selected portion of the design range;

based on the phase map, determining a target width of the nanostructure and a target pitch of the nanostructure that provide a target phase corresponding to a distance from a center point of the metalens; and placing the nanostructure having the target width and the target pitch at a position of the metalens corresponding to the target phase.

19. The method of claim 18, further comprising:

determining the height of the nanostructure after determining the material of the nanostructure and the material of the spacer layer.

20. The method of claim 18, wherein the metalens includes a first layer and a second layer disposed on the first layer, the nanostructure includes a first nanostructure associated with the first layer and a second nanostructure associated with the second layer, and the spacer layer includes a first spacer layer associated with the first layer and a second spacer layer associated with the second layer.

* * * * *